*US007684674B2*

United States Patent
Hamada et al.

(10) Patent No.: US 7,684,674 B2
(45) Date of Patent: Mar. 23, 2010

(54) OPTICAL REPRODUCING APPARATUS HAVING PROTECTION FLAGS AND CODE NUMBER

(75) Inventors: Toshiya Hamada, Saitama (JP); Motoki Kato, Kanagawa (JP)

(73) Assignee: Sony Corporation (JP)

( * ) Notice: Subject to any disclaimer, the term of this patent is extended or adjusted under 35 U.S.C. 154(b) by 1762 days.

(21) Appl. No.: 10/450,216

(22) PCT Filed: Oct. 16, 2002

(86) PCT No.: PCT/JP02/10724

§ 371 (c)(1),
(2), (4) Date: Feb. 11, 2004

(87) PCT Pub. No.: WO03/034429

PCT Pub. Date: Apr. 24, 2003

(65) Prior Publication Data

US 2004/0120694 A1 Jun. 24, 2004

(30) Foreign Application Priority Data

Oct. 16, 2001 (JP) .............................. 2001-317910

(51) Int. Cl.
*H04N 5/91* (2006.01)
(52) U.S. Cl. ..................... 386/95; 386/125; 369/53.2
(58) Field of Classification Search .................. 386/95, 386/125, 126, 52, 55, 69; 369/53.2, 53.21, 369/53.41, 53.42
See application file for complete search history.

(56) References Cited

U.S. PATENT DOCUMENTS

| 5,729,516 | A | 3/1998 | Tozaki et al. | |
|---|---|---|---|---|
| 7,236,687 | B2 * | 6/2007 | Kato et al. | 386/95 |
| 7,437,055 | B2 * | 10/2008 | Hamada et al. | 386/69 |
| 7,477,833 | B2 * | 1/2009 | Kato et al. | 386/125 |
| 2002/0135607 | A1 * | 9/2002 | Kato et al. | 345/716 |
| 2002/0135608 | A1 * | 9/2002 | Hamada et al. | 345/723 |
| 2002/0145702 | A1 * | 10/2002 | Kato et al. | 352/1 |
| 2002/0150383 | A1 * | 10/2002 | Kato et al. | 386/69 |
| 2002/0164152 | A1 * | 11/2002 | Kato et al. | 386/95 |

(Continued)

FOREIGN PATENT DOCUMENTS

EP 737874 10/1996

(Continued)

*Primary Examiner*—Tan X Dinh
(74) *Attorney, Agent, or Firm*—Lerner, David, Littenberg, Krumholz & Mentlik, LLP

(57) ABSTRACT

An apparatus and a method for reproducing a recording medium which requires input of a code number only once when the code number is required to be input to both a directory and a PlayList for reproduction. A plurality of directories, such as DVR, DVR1, DVRn and the like, are formed on a disk. One directory DVR has a flag DVR_protect_flag (first control information) set therein for controlling reproduction of information belonging in the directory. Also, a file associated with the PlayList, which is one piece of information in the directory DVR, has a playback_control_flag (second control information) set therein for controlling reproduction thereof. In a case where the DVR_protect_flag is 1, reproduction is allowed only when a correct code number is input. In a case where the DVR_protect_flag and the playback_control_flag are both 1, input of the code number for the playback_control_flag is omitted when the correct code number has already been input for the DVR_protect_flag.

11 Claims, 25 Drawing Sheets

U.S. PATENT DOCUMENTS

| | | | |
|---|---|---|---|
| 2003/0103604 A1* | 6/2003 | Kato et al. | 379/68 |
| 2005/0105888 A1* | 5/2005 | Hamada et al. | 386/95 |
| 2007/0183750 A1* | 8/2007 | Hamada et al. | 386/95 |
| 2007/0286577 A1* | 12/2007 | Kato et al. | 386/95 |

FOREIGN PATENT DOCUMENTS

| | | |
|---|---|---|
| EP | 911825 | 4/1999 |
| EP | 1 103 974 A2 | 5/2001 |
| GB | 2356485 | 5/2001 |
| JP | 07-334645 A | 12/1995 |
| JP | 09-245438 A | 9/1997 |
| JP | 9-259235 A1 | 10/1997 |
| JP | 10-293664 | 11/1998 |
| JP | 10-322529 A1 | 12/1998 |
| JP | 11-296978 A | 10/1999 |
| JP | 2000-013720 | 1/2000 |
| JP | 2000-059555 A | 2/2000 |
| JP | 2000-105788 A1 | 4/2000 |
| JP | 2000-163882 A1 | 6/2000 |
| JP | 2000-255119 A | 9/2000 |
| JP | 2000-259569 A | 9/2000 |
| JP | 2001-22676 A1 | 1/2001 |
| JP | 2001-51987 A1 | 2/2001 |
| JP | 2001-157145 A1 | 6/2001 |
| JP | 2001-209585 A | 8/2001 |
| JP | 2001-249784 A1 | 9/2001 |
| JP | 2001-268510 A | 9/2001 |
| JP | 2002-314929 A | 10/2002 |
| WO | 01/82606 | 11/2001 |

* cited by examiner

FIG. 4

| Syntax | No.of bits | Mnemonics |
|---|---|---|
| info.dvr{ | | |
|     version_number | 8*4 | bslbf |
|     TableOfPlayLists_Start_address | 32 | uimsbf |
|     MakerPrivateData_Start_address | 32 | uimsbf |
|     reserved_for_future_use | 192 | bslbf |
|     UIAppInfoDVR() | | |
|     for(i=0;i<N1;i++){ | | |
|         padding_word | 16 | bslbf |
|     } | | |
|     TableOfPlayLists() | | |
|     for(i=0;i<N2;i++){ | | |
|         padding_word | 16 | bslbf |
|     } | | |
|     MakersPrivateData() | | |
|     for(i=0;i<N3;i++){ | | |
|         padding_word | 16 | bslbf |
|     } | | |
| } | | |

F I G. 5

| Syntax | No.of bits | Mnemonics |
|---|---|---|
| UIAppInfoDVR(){ | | |
|     length | 32 | uimsbf |
|     reserved_for_future_use | 16 | bslbf |
|     DVR_character_set | 8 | bslbf |
|     reserved_for_word_align | 6 | bslbf |
|     DVR_protect_flag | 1 | bslbf |
|     resume_valid_flag | 1 | bslbf |
|     PIN | 8*4 | bslbf |
|     resume_PlayList_file_nama | 8*10 | bslbf |
|     ref_to_menu_thumbnail_index | 16 | uimsbf |
|     DVR_name_length | 8 | uimsbf |
|     DVR_name | 8*256 | bslbf |
| } | | |

F I G. 6

| Syntax | No.of bits | Mnemonics |
|---|---|---|
| TableOfPlayLists(){ | | |
|     length | 32 | uimsbf |
|     number_of_PlayLists | 16 | uimsbf |
|     for(i=0;i<*number_of_PlayLists*;i++){ | | |
|         PlayList_file_name | 8*10 | bslbf |
|     } | | |
| } | | |

FIG. 7

| Syntax | No. of bits | Mnemonics |
|---|---|---|
| xxxxx.rpls / yyyyy.vpls{ | | |
|     version_number | 8*4 | bslbf |
|     PlayList_start_address | 32 | uimsbf |
|     PlayListMark_start_address | 32 | uimsbf |
|     MakersPrivateData_Start_address | 32 | uimsbf |
|     reserved_for_future_use | 160 | bslbf |
|     UIAppInfoPlayList() | | |
|     for(i=0;i<N1;i++){ | | |
|         padding_word | 16 | bslbf |
|     } | | |
|     PlayList() | | |
|     for(i=0;i<N2;i++){ | | |
|         padding_word | 16 | bslbf |
|     } | | |
|     PlayListMark() | | |
|     for(i=0;i<N3;i++){ | | |
|         padding_word | 16 | bslbf |
|     } | | |
|     MakersPrivateData() | | |
|     for(i=0;i<N4;i++){ | | |
|         padding_word | 16 | bslbf |
|     } | | |
| } | | |

F I G. 8

| Syntax | No.of bits | Mnemonics |
|---|---|---|
| UIAppInfoPlayList(){ | | |
|     length | 32 | uimsbf |
|     PlayList_character_set | 8 | uimsbf |
|     reserved_for_word_align | 3 | bslbf |
|     Playback_control_flag | 1 | uimsbf |
|     write_protect_flag | 1 | uimsbf |
|     is_played_flag | 1 | uimsbf |
|     archive | 2 | uimsbf |
|     record_time_and_date | 4*14 | bslbf |
|     PlayList_duration | 4*6 | bslbf |
|     maker_ID | 16 | uimsbf |
|     maker_model_code | 16 | uimsbf |
|     ref_to_thumbnail_index | 16 | uimsbf |
|     channel_number | 16 | uimsbf |
|     reserved_for_word_align | 8 | bslbf |
|     channel_name_length | 8 | uimsbf |
|     channel_name | 8*20 | bslbf |
|     PlayList_name_length | 8 | uimsbf |
|     PlayList_name | 8*255 | bslbf |
|     PlayList_detail_length | 16 | uimsbf |
|     PlayList_detail | 8*1200 | bslbf |
| } | | |

FIG. 9

| Syntax | No.of bits | Mnemonics |
|---|---|---|
| PlayList(){ | | |
|     length | 32 | uimsbf |
|     reserved_for_word_align | 15 | bslbf |
|     CPI_type | 1 | bslbf |
|     number_of_PlayItems | 16 | uimsbf |
|     if(<Virtual-PlayList>&&CPI_type==0){ | | |
|         number_of_SubPlayItems | 16 | uimsbf |
|     }else{ | | |
|         reserved_for_word_align | 16 | bslbf |
|     } | | |
|     for(PlayItem_id=0;<br>        PlayItem_id<number_of_PlayItems;<br>        PlayItem_id++){ | | |
|         PlayItem() | | |
|     } | | |
|     if(<Virtual-PlayList>&&CPI_type==0){ | | |
|         for(i=0;i<number_of_SubPlayItems;i++){ | | |
|         SubPlayItem() | | |
|         } | | |
|     } | | |
| } | | |

FIG. 10

| Syntax | No.of bits | Mnemonics |
|---|---|---|
| PlayItem(){ | | |
|     length | 32 | uimsbf |
|     Clip_Information_file_name | 8*10 | bslbf |
|     reserved_for_word_align | 6 | bslbf |
|     connection_condition | 2 | bslbf |
|     if(CPI_type==0){ | | |
|         ref_to_STC_id | 8 | uimsbf |
|     }else{ | | |
|         reserved_for_word_align | 8 | bslbf |
|     } | | |
|     IN_time | 32 | uimsbf |
|     OUT_time | 32 | uimsbf |
|     if(<Virtual-PlayList>&&connection_condition=='10'){ | | |
|         BridgeSequenceInfo() | | |
|     } | | |
| } | | |

FIG. 12

| Syntax | No.of bits | Mnemonics |
|---|---|---|
| PlayListMark(){ | | |
|     length | 32 | uimsbf |
|     number_of_PlayList_Marks | 16 | uimsbf |
|     for(i=0;i<*number_of_PlayList_marks*;i++){ | | |
|         mark_invalid_flag | 1 | uimsbf |
|         mark_type | 7 | uimsbf |
|         mark_name_length | 8 | uimsbf |
|         ref_to_PlayItem_id | 16 | uimsbf |
|         mark_time_stamp | 32 | uimsbf |
|         entry_ES_PID | 16 | uimsbf |
|         ref_to_thumbnail_index | 16 | uimsbf |
|         mark_name | 8*32 | bslbf |
|     } | | |
| } | | |

FIG. 14

| Syntax | No.of bits | Mnemonics |
|---|---|---|
| zzzzz.clpi{ | | |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     MakersPrivateData_start_address | 32 | uimsbf |
|     reserved_for_future_use | 96 | bslbf |
|     ClipInfo() | | |
|     for(i=0;i<N1;i++){ | | |
|         padding_word | 16 | bslbf |
|     } | | |
|     SequenceInfo() | | |
|     for(i=0;i<N2;i++){ | | |
|         padding_word | 16 | bslbf |
|     } | | |
|     ProgramInfo() | | |
|     for(i=0;i<N3;i++){ | | |
|         padding_word | 16 | bslbf |
|     } | | |
|     CPI() | | |
|     for(i=0;i<N4;i++){ | | |
|         padding_word | 16 | bslbf |
|     } | | |
|     ClipMark() | | |
|     for(i=0;i<N5;i++){ | | |
|         padding_word | 16 | bslbf |
|     } | | |
|     MakerPrivateDate() | | |
|     for(i=0;i<N6;i++){ | | |
|         padding_word | 16 | bslbf |
|     } | | |
| } | | |

FIG. 15

| | (A) | (B) | (C) | (D) |
|---|---|---|---|---|
| DVR_protect_flag | 0 | 1 | 0 | 1 |
| playback_control_flag | 0 | 0 | 1 | 1 |
| EXAMPLE OF USE | (1) DISK WITHOUT REPRODUCTION CONTROL (2) WHEN DISK IS USED BY USER ALONE | (1) WHEN DISK IS DESIRED TO BE FOR EXCLUSIVE USE OF USER SO THAT NO OTHER PERSON CAN SEE DISK (2) WHEN DISK IS USED AS MULTI-USER DISK | (1) WHEN UNNECESSARY PLAYLIST IS NOT DESIRED TO BE DISPLAYED (2) WHEN DISK IS GIVEN TO ANOTHER PERSON AND ONLY PLAYLISTS DESIRED BY CREATOR TO BE SHOWN ARE TO BE DISPLAYED | SITUATION OF (B) AND (C) |

"0" INDICATES THAT REPRODUCTION IS ALLOWED AND
"1" INDICATES THAT REPRODUCTION IS NOT ALLOWED

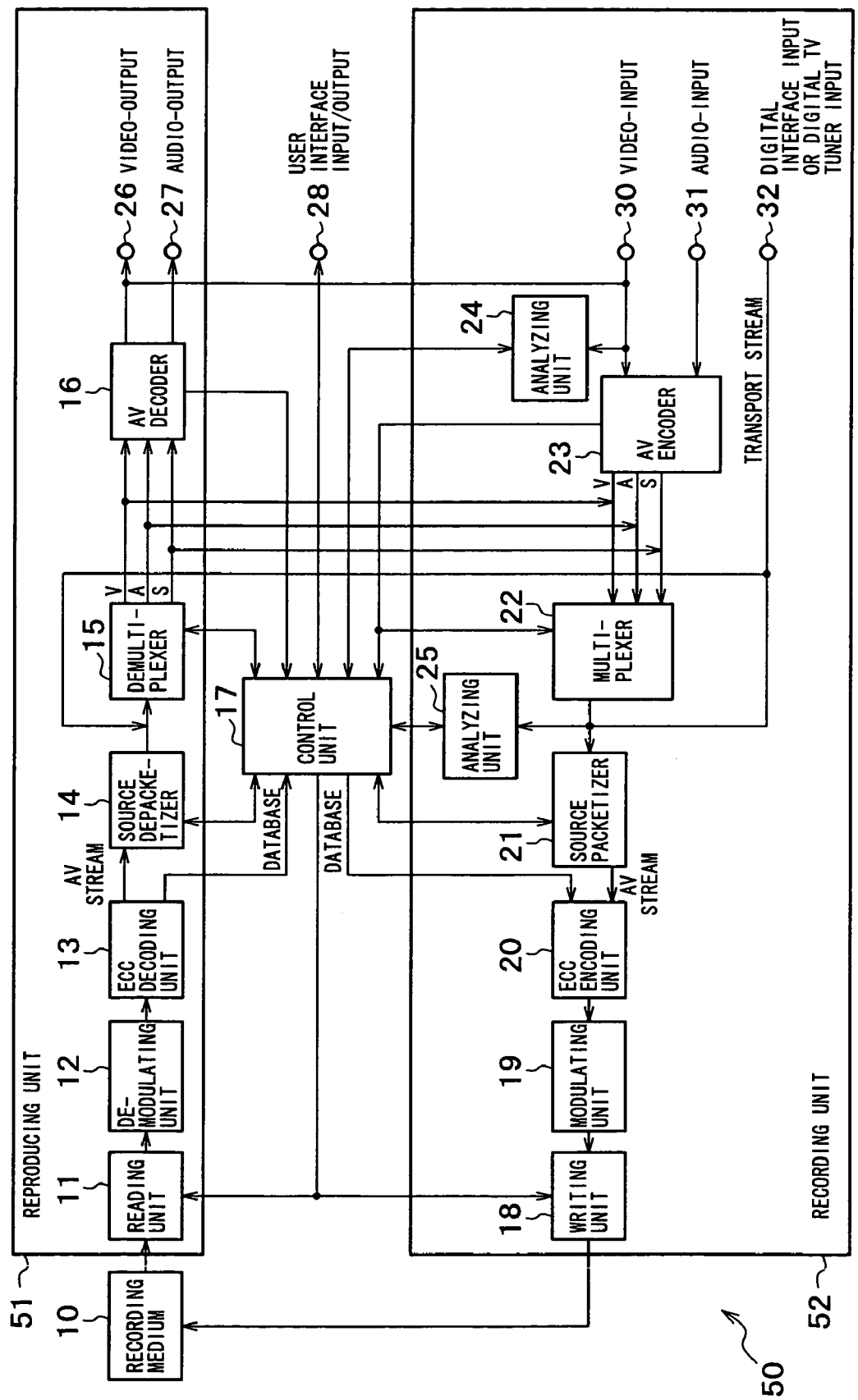

FIG. 19

```
CODE NUMBER INPUT

THIS DIRECTORY IS LOCKED.              ENTER
    INPUT CODE NUMBER TO RELEASE LOCK.
                                           CANCEL

CODE NUMBER    1    2    3    4

SELECT BY ↑↓→←
  PRESS [ENTER] BUTTON TO EFFECT INPUT
```

FIG. 22

| | SELECT PLAYLIST TO BE REPRODUCED | | |
|---|---|---|---|
| 1 | DRAMA (6) | 2001/08/29 | LATEST |
| 2 | PROFESSIONAL BASEBALL RELAY BROADCAST 50TH GAME | 2001/08/20 | UNVIEWED |
| 3 | ************************ | ********** | LOCKED |
| 4 | FOREIGN-FILM THEATER | 2001/08/22 | FAVORITE RECORDING |

↓ CONTINUED TO NEXT PAGE

| DIRECTORY SELECTION | INITIAL SETTING |
|---|---|
| EJECT DISK | EXIT MENU |

SELECT BY ↑↓

PRESS [ENTER] TO EFFECT SELECTION

OPTICAL REPRODUCING APPARATUS HAVING PROTECTION FLAGS AND CODE NUMBER

BACKGROUND OF THE INVENTION

1. Field of the Invention

The present invention relates to an apparatus and method for reproducing a recording medium, and particularly to an apparatus and a method for reproducing a recording medium that make it possible to control reproduction by a simple operation by recording flags for controlling reproduction of AV data onto a disk and using the flags at the time of reproduction.

2. Background Art

Optical disks are disk type recording media which are recordable and removable from a recording and reproducing apparatus. Such recordable optical disks can be large-capacity media having a capacity of a few gigabytes or more and can be used as media for recording AV (Audio Visual) signals such as video signals and the like.

A source (source of supply) of digital AV signals, which can be recorded on the recordable optical disks, can include digital satellite broadcasting such as CS (Communication Satellite) digital broadcasting and BS (Broadcasting Satellite) digital broadcasting in Japan, for example. In addition, digital terrestrial television broadcasting and the like are being considered for the future.

Digital video signals supplied from these sources are typically video-compressed by an MPEG (Moving Picture Experts Group)-2 Video system. Also, in a recording apparatus, a recording rate specific to the apparatus is generally determined. When a digital video signal from a digital broadcast is recorded on conventional video storage media for consumer use, in an analog recording system, the digital video signal is decoded, subjected to digital-to-analog conversion and band limitation, and recorded. In a digital recording system such as an MPEG-1 Video system, an MPEG-2 Video system, a DV (Digital Video) system or the like, on the other hand, the digital video signal is decoded by a tuner, then re-encoded using an encoding system and a recording rate specific to the recording apparatus, and recorded.

However, such recording methods may involve degradation in picture quality because the supplied bit stream is decoded, thereafter subjected to band limitation or re-encoding, and then recorded. When a video-compressed digital signal is recorded and a transmission rate of the video-compressed digital signal exceeds a recording rate of the disk, the recording and reproducing apparatus needs to decode the digital signal, thereafter re-encode the digital signal so as to decrease the transmission rate to an upper limit of the recording rate of the disk or lower, and then record the digital signal. However, when the transmission rate of the input digital signal does not exceed the recording rate of the recording and reproducing apparatus, degradation in picture quality is minimized by a method of recording the supplied bit stream, as is, without decoding or re-encoding the bit stream.

The transmission rate of digital signals may not always be constant. When a digital signal is transmitted by a variable rate system in which the bit rate of the digital signal fluctuates with time, a tape recording system having a fixed recording rate, because of a fixed rotational speed of a rotary head, maintains a constant bit rate at all times by stuffing empty packets, for example. This means recording at a maximum bit rate at all times and hence wasteful consumption of recording capacity. On the other hand, a disk recording apparatus can temporarily store data in a buffer, and record the data onto a disk on a burst and an intermittent basis. Hence, such disk recording apparatus may eliminate the need for inserting empty packets, and can therefore use capacity on a recording medium in a less wastefull manner.

Thus, a recording and reproducing apparatus that records a digital broadcast signal, as is, without decoding or re-encoding the digital broadcast signal as in a data streamer and uses a disk as a recording medium, may be more desirable in the future when digital broadcasting becomes more mainstream.

In the present application, a unit in which a user selects and reproduces AV data (i.e., a unit in which the user expects reproduction to be performed continuously) is referred to as a playlist. An example of a playlist is continuous video (contents) from a start of recording to an end of the recording.

A function of preventing an entire disk or playlists recorded on the disk from being readily reproduced is considered. A mechanism that sets a code number and does not allow reproduction unless the code number is input may be useful when there are contents not desired to be viewed by others and when there is a playlist not desired to be changed.

SUMMARY OF THE INVENTION

The present invention provides techniques to enable reproduction control by a simple operation.

According to the present invention, there is provided a reproducing apparatus, comprising: setting means for setting first control information for controlling reproduction of information recorded in directories on a recording medium, each directory having a reproduction list, and for setting second control information for controlling reproduction of the reproduction list belonging to each directory; input means for inputting a code number for the first and second control information; and determining means for determining, when the first control information and the second control information are both active, whether input of the code number for one of the first or the second control information is required based on the input of the code number for the other of the first or second control information.

The recording medium can have a plurality of directories and the code number can be set in each of the directories.

The reproduction list can include a Playlist.

The reproducing apparatus can further comprise a display control means for controlling display of information in the directory or the reproduction list, wherein the display control means prohibits display of the information in the directory or the reproduction list when the first control information or the second control information is active.

The reproducing apparatus can further comprise a display control means for controlling display of information in the directory or the reproduction list, wherein the display control means displays the information in the directory or the reproduction list to prevent selection thereof when the first control information or the second control information is active.

The reproducing apparatus can further comprise a display control means for controlling display of information regarding the directory or the reproduction list, wherein the display control means displays the information regarding the directory or the reproduction list as hidden characters when the first control information or the second control information is active.

The reproducing apparatus can further comprise a display control means for controlling display of information regarding a recordable capacity of the recording medium, wherein, when selected information, in which associated first control information or second control information is active is recorded on the recording medium, the display control means controls display of the information regarding the recordable capacity such that the recordable capacity does not include a capacity occupied by the selected information.

According to the present invention, there is provided a reproducing method, comprising: setting first control information for controlling reproduction of information recorded in directories on a recording medium, each directory having a reproduction list, and for setting second control information for controlling reproduction of the reproduction list belonging to each directory; inputting a code number for the first and second control information; and determining, when the first control information and the second control information are both active, whether input of the code number for one of the first or the second control information is required based on the input of the code number for the other of the first or second control information.

According to the present invention, there is provided a recording medium recorded with a computer readable program for causing a computer to execute a reproducing method, the method comprising: setting first control information for controlling reproduction of information in directories recorded on a recording medium, each directory having a reproduction list, and for setting second control information for controlling reproduction of the reproduction list belonging to each directory; inputting a code number for the first and second control information; and determining, when the first control information and the second control information are both active, whether input of the code number for one of the first or the second control information is required based on the input of the code number for the other of the first or second control information.

According to the present invention, there is provided a system for processing information, the system comprising: a processor operable to execute instructions; and instructions for causing the processor to execute an reproducing method, the method including: setting first control information for controlling reproduction of information in directories recorded on a recording medium, each directory having a reproduction list, and for setting second control information for controlling reproduction of the reproduction list belonging to each directory; inputting a code number for the first and second control information; and determining, when the first control information and said second control information are both active, whether input of the code number for one of the first or second control information is required based on the input of the code number for the other of the first or the second control information.

According to the present invention, there is provided a reproducing apparatus, comprising: setting mechanism operable to set first control information for controlling reproduction of information recorded in directories on a recording medium, each directory having a reproduction list, and to set second control information for controlling reproduction of the reproduction list belonging to each directory; input mechanism operable to input a code number for the first and second control information; and determining mechanism operable to determine, when the first control information and the second control information are both active, whether input of the code number for one of the first or the second control information is required based on the input of the code number for the other of the first or second control information.

According to the present invention, there is provided a recording medium having information recorded thereon, the recording medium characterized in that first control information for controlling reproduction of the recorded information in each directory, second control information for controlling reproduction of each reproduction list belonging to the directory, and a code number corresponding to each of a plurality of directories are recorded.

With the recording medium reproducing apparatus and method, the recording medium, and the program according to the present invention, when first control information for controlling reproduction of information in each directory which information is recorded on the recording medium and second control information for controlling reproduction of each reproduction list belonging to the directory are both active, on the basis of input of a code number for either of the first control information and the second control information, input of the code number for the other control information is determined.

On the recording medium according to the present invention, first control information for controlling reproduction of recorded information in each directory, second control information for controlling reproduction of each reproduction list belonging to the directory, and a code number corresponding to each of a plurality of directories are recorded.

BRIEF DESCRIPTION OF THE DRAWINGS

FIG. 4 is a diagram of an info.dvr file structure;
FIG. 5 is a diagram of a UIAppInfoDVR( )data structure;
FIG. 6 is a diagram of a TableOfPlayList( )data structure;
FIG. 7 is a diagram of a PlayList file structure;
FIG. 8 is a diagram of a UIAppInfoPlayList( )data structure;
FIG. 9 is a diagram of a PlayList( )data structure;
FIG. 10 is a diagram of a PlayItem( )data structure;
FIG. 12 is a diagram of a PlayListMark( ) data structure;
FIG. 14 is a diagram of a Clip file structure;
FIG. 15 is a diagram of combinations of flags;
FIG. 16 is a block diagram showing a configuration of a moving image recording and reproducing apparatus;
FIG. 19 is a diagram showing an example of a code number input screen;
FIG. 22 is a diagram showing an example of a display of a menu screen for PlayList selection.

DETAILED DESCRIPTION

A bit stream encoded by an encoding method such as MPEG Video, MPEG Audio and the like and multiplexed according to MPEG-2 Systems, and converted to a form of a file handled by a file system and then recorded on a disk is referred to as an AV (Audio Video) stream file (or a Clip AV stream).

Figure 1:
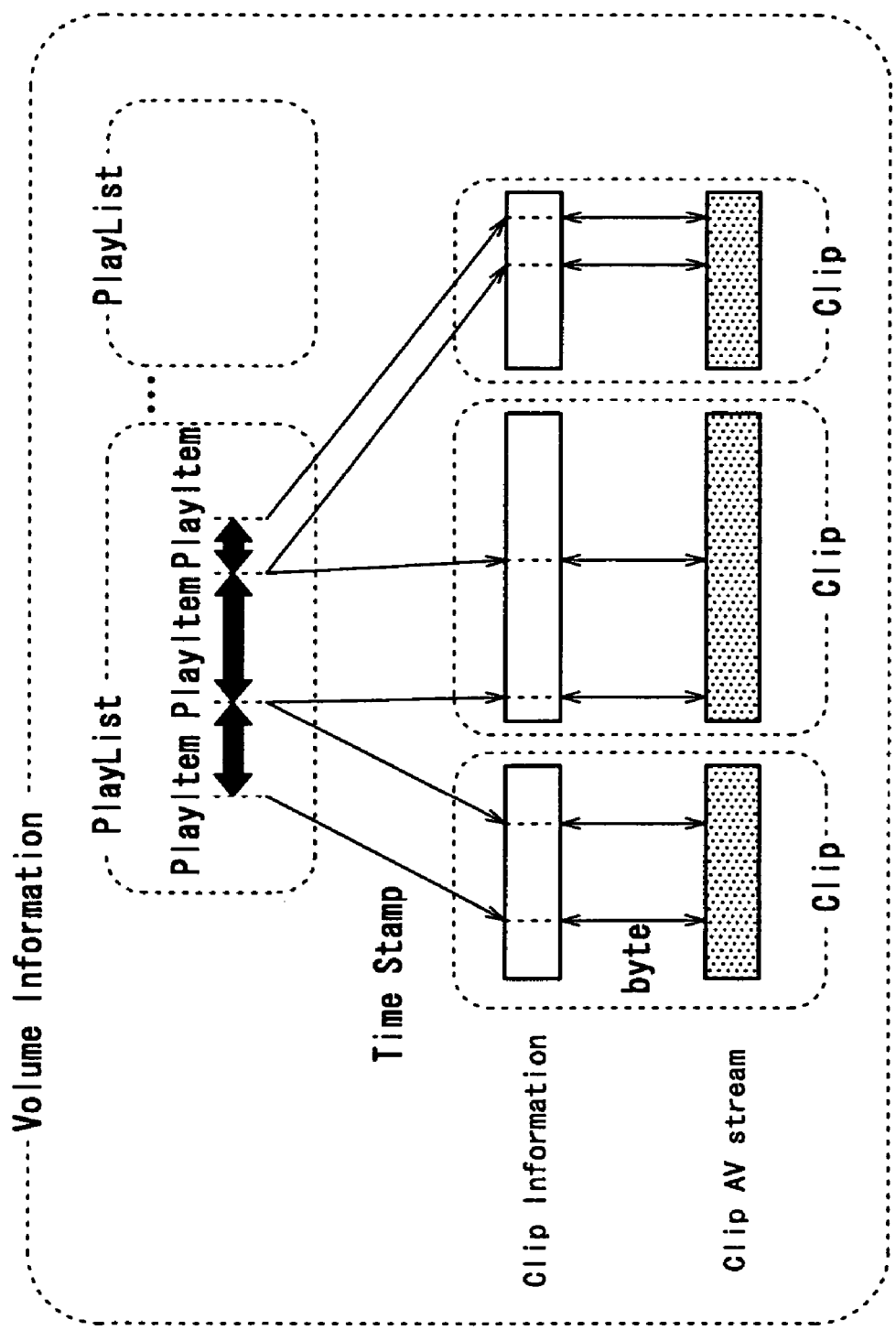
FIG. 1 is a diagram showing a relationship between Clips and Playlists.

A description will be provided of a mechanism of reproduction sequence specification that specifies a part or an entire range of such an AV stream file to thereby reproduce a sequence of only necessary parts. FIG. 1 shows a reproduction sequence specification which specifies a part or an entire range of an AV stream file to thereby reproduce only necessary parts, is referred to as a PlayList. The PlayList as a reproduction list is a combined unit of video and audio as viewed from a user. The unit is simplest when formed from a start of recording to an end of the recording, and this unit forms one PlayList when no editing is performed.

The PlayList includes a specification of an AV stream file or a specification of which AV stream to reproduce, and a set of a reproduction start point and a reproduction end point in the file. The information of the specification of the AV stream file, the reproduction start point (IN point), and the reproduction end point (OUT point) forms a set, which is referred to as a PlayItem. The PlayList can include a plurality of PlayItems.

As shown in FIG. 1, a PlayItem refers to a range specified by an IN point and an OUT point of an AV stream file. Reproducing the PlayItem is defined as reproducing a part of the AV stream that is referred to by the PlayItem.

The AV stream can be a bit stream multiplexed to form an MPEG-2 TS (Transport Stream) or the like. A file separate from a file having the AV stream recorded therein retains information (Clip information) in a one-to-one correspondence with the bit stream. This facilitates reproduction and editing. The Clip information and the AV stream are considered to be one object, which is referred to as a Clip. That is, the Clip is an object comprising the AV stream and the information associated therewith.

Figure 2:
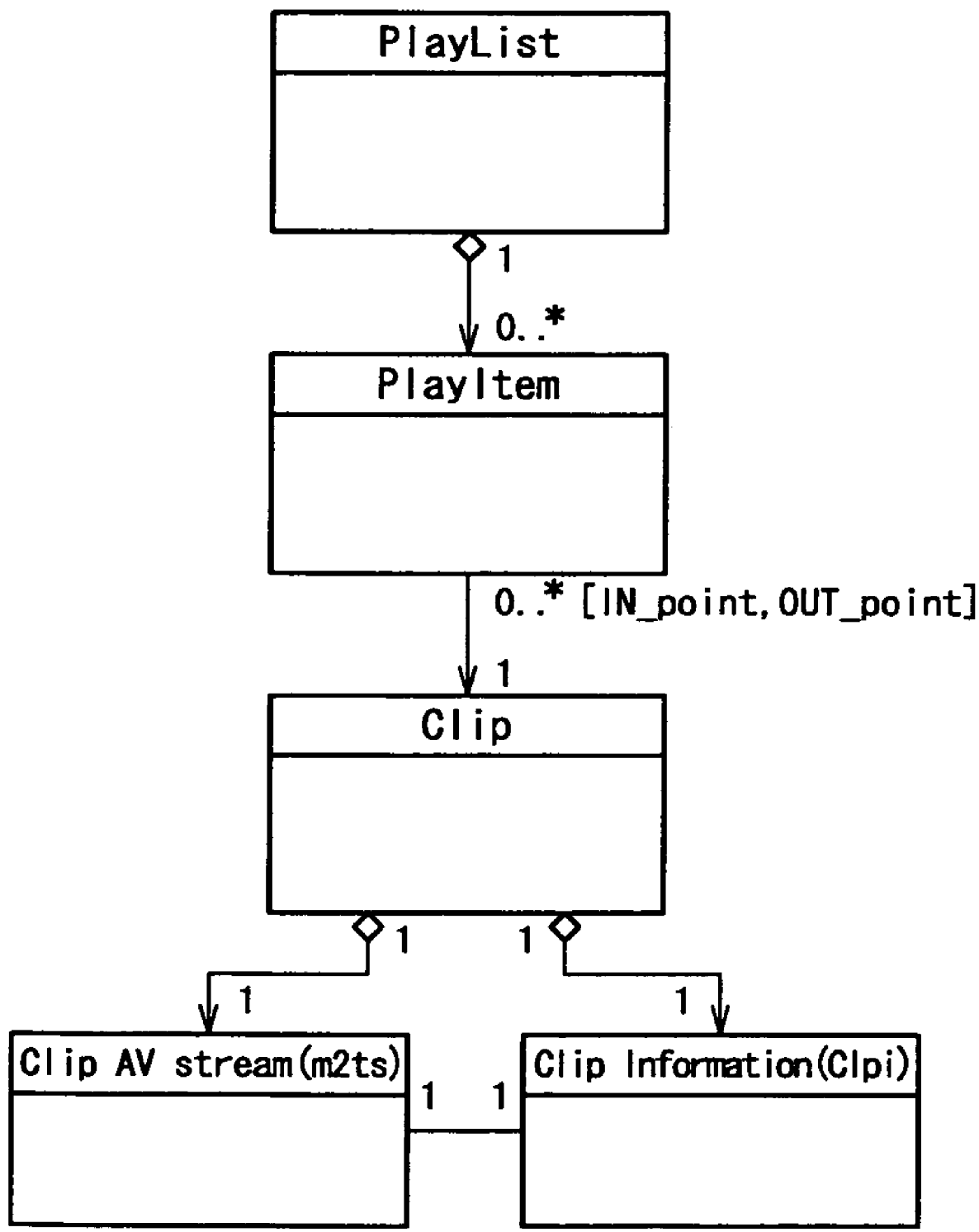
FIG. 2 is a UML diagram showing a structure for managing an AV stream.

FIG. 2 shows a relationship between the AV stream file, the Clip, the PlayItem, and the PlayList as described above in UML (Unified Modeling Language). An arrow having a rhombus at a starting point thereof and connecting the PlayList with the PlayItem, and a number adjacent to the rhombus indicates that "one PlayList includes more than zero PlayItems."

The PlayItem and the Clip are connected to each other by an arrow without a rhombus, and a one-to-many relation between the Clip and the PlayItem is indicated by a number (* is an arbitrary number and 0 . . . * denotes an arbitrary number). This indicates that more than zero PlayItems specifying a range in one Clip by a set of an IN_point and an OUT_point are created from the Clip. One Clip includes one Clip AV stream and one piece of Clip Information serving as Clip attribute information. A line connecting the Clip AV stream with the Clip Information indicates a one-to-one correspondence of a stream file with an extension m2ts and the Clip Information as the Clip attribute information with an extension clip. The definition of such a structure enables so-called nondestructive reproduction sequence specification for reproducing only arbitrary parts without changing the AV stream file.

Figure 3:
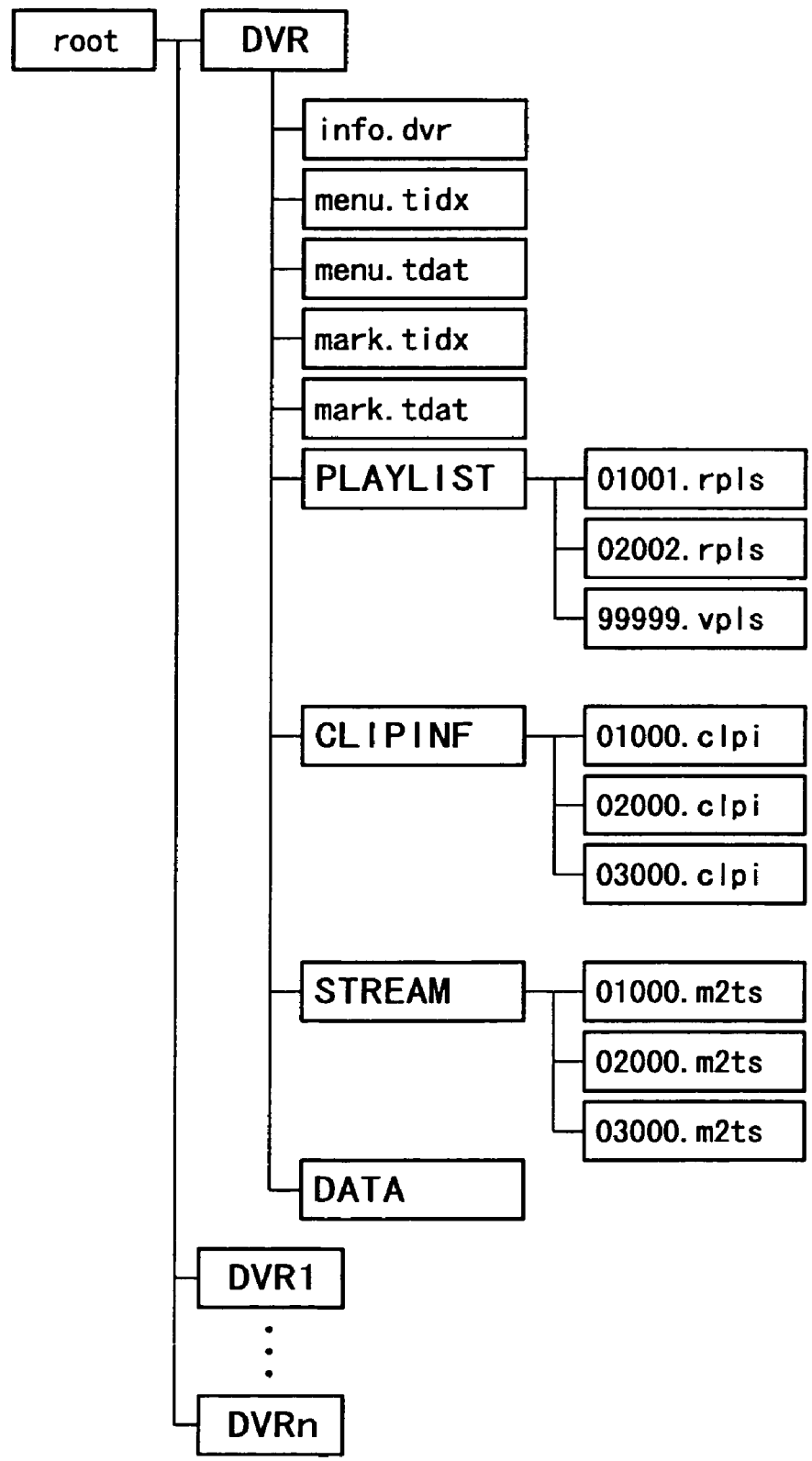
FIG. 3 is a diagram showing a directory structure of a DVR system.

Files on a recording medium (media) where information is recorded and reproduced, for realizing the present invention, will next be described. As shown in FIG. 3, the following six kinds of files are recorded under a DVR directory.

(1) info.dvr: A file storing information on the directory as a whole.

(2) menu.tidx, mark.tidx: An information file of a thumbnail picture.

(3) menu.tdat, mark.tdat: A file storing a thumbnail picture.

(4) #####.rpls, #####.vpls (##### is an arbitrary number): A file storing information of a PlayList.

(5) %%%%%.clpi (%%%%% is an arbitrary number): A file storing information of a Clip.

(6) %%%%%.m2ts: A file storing a stream.

(%%%%% is such a number as establishes a one-to-one correspondence of each m2ts.file with a clpi file.)

A directory is provided on a disk, and a range under the directory is managed by a recording and reproducing system. The /DVR directory may exist in a root directory of the disk or under a certain directory. As shown in FIG. 4, a directory /DVRn (where n is an integer of more than 1) may exist as a directory for extension at the same level where the /DVR directory exists. A structure under /DVRn is identical with that of the /DVR directory, and therefore only the structure under the /DVR directory will be described in the following.

Files info.dvr, menu.tidx, menu.tdat, mark.tdix, and mark.tdat are placed under the /DVR directory. Also directories /PLAYLIST, /CLIPINF, /STREAM, and /DATA are placed under the /DVR directory.

Files #####.rpls and #####.vpls are placed under the /PLAYLIST directory. File %%%%%.clpi is placed in the /CLIPINF directory. File %%%%%.m2ts is placed in the /STREAM directory.

There is only one file info.dvr under the /DVR directory. A structure of the info.dvr file is represented by the syntax shown in FIG. 4. A block is formed for each piece of information with a different function within the file. A version_number field stores a version number of the info.dvr file. Information under the directory is stored in the UIAppInfoDVR( ) structure. Information on a list of Playlists is stored in the TableOfPlayLists( ) structure. Information unique to a manufacturer of the recording and reproducing apparatus is stored in the MakersPrivateData( ) structure. Addresses information indicating the head of these blocks are described in a head portion of the file. For example, a TableOfPlayLists_Start_address field indicates a position where the TableOfPlayLists( )structure starts by a relative number of bytes within the file.

A structure of the UIAppInfoDVR( ) structure is represented by the syntax shown in FIG. 5. A length field indicates, in bytes, a length from a field immediately after the length to an end of the UIAppInfoDVR( ) structure. A DVR_character_set field indicates a character set of a character string described in a file under the DVR directory. For example, it indicates an encoding method of a character string recorded in a DVR_name field within the UIAppInfoDVR( ) structure. As the encoding method, ASCII, Unicode or the like can be selected. A DVR_protect_flag flag as a control signal is a flag that indicates whether contents under the DVR directory may be shown to a user without limitation. In a case where the flag is set to 1, contents under the directory can be shown to the user only when the user can input a correct PIN (Personal Identification Number) number (PIN is shown in FIG. 5) as a code number. When the flag is set to 0, the contents can be shown to the user without the user having to input the PIN number. The above description refers to reproduction limitation on the directory. On the other hand, reproduction limitation on each individual PlayList is specified by a playback_control_flag flag defined in a UIAppInfoPlayList( ) structure of FIG. 8 to be described later. Details of reproduction control and reproduction limitation will be described later.

A resume_valid_flag flag indicates whether a resume function for specifying a PlayList to be reproduced first when starting reproduction of the DVR directory is enabled or disabled. When the flag is 1, a PlayList specified by a resume_PlayList_file_name field is treated as a PlayList to be reproduced first. The resume function is expected to be used when reproduction is to be resumed at a position where viewing last time was stopped, for example.

A PIN is four numbers each number ranging from 0 to 9. The PIN indicates a code number required when reproduction control is enabled. Each number is encoded in accordance with ISO/IEC646. A ref_to_menu_thumbnail_index field is a region for, when there is a thumbnail representing the directory, storing a thumbnail number identifying the thumbnail. A thumbnail having a thumbnail_index specified by the ref_to_menu_thumbnail_index is a menu thumbnail representing the directory (in the present invention, a still picture representing the directory, in particular, is referred to as a menu thumbnail).

A DVR_name_length field indicates length, in bytes, of a DVR directory name indicated by a DVR_name. A number of bytes corresponding to the DVR_name_length field from the left in this field form a valid character string, which indicates the name of the directory. In the DVR_name field, a byte string following the valid character string indicated by the DVR_name_length field may contain any value.

FIG. 6 shows the syntax of the TableOfPlayLists( ) structure. A number_of_PlayLists field indicates a number of PlayLists in the directory, and a list of PlayLists in a subsequent loop indicates an order of PlayLists displayed on a menu screen. A PlayList_file_name specifies a file name such as #####.rpls, #####.vpls or the like. A PlayList is specified by the file name.

Files #####.rpls and #####.vpls are present under the /PLAYLIST directory. One file is in a one-to-one correspondence with each PlayList. FIG. 7 shows a structure of files #####.rpls and #####.vpls. A block is formed for each piece of information with a different function within the file. A UIAppInfoPlayList( ) structure stores attribute information about the PlayList. A PlayList( ) structure stores information on PlayItems forming the PlayList. A PlayListMark( ) structure stores information on marks attached to the PlayList. A MakersPrivateData( ) structure stores information unique to a manufacturer of the recording and reproducing apparatus that recorded the PlayList file. A 32-bit address (PlayListMark_start_address or the like) indicating the head of a block is described in a head portion of the file. This enables a padding_word element to be inserted at the front or the rear of a block. However, a starting position of the UIAppInfoPlayList( )structure or a first block in the file is fixed at a 256th byte from the head of the file.

The UIAppInfoPlayList( ) structure of FIG. 8 stores the attribute information about the PlayList, wherein such information is not directly required for reproduction of the PlayList. Specifically, the following information is stored.

PlayList_character_set: Specifies a character set of character string information about the PlayList.

playback_control_flag: When this flag as a control signal is 1, a thumbnail and other information of the PlayList cannot be displayed onto a menu and the PlayList cannot be reproduced unless the PIN is input.

write_protect_flag: An erase prohibiting flag. When this flag is 1, a user interface that prohibits a user from easily erasing the PlayList is required.

is_played_flag: A flag indicating that the PlayList has already been reproduced.

archive: A flag indicating that the PlayList is a non-copy, original PlayList.

record_time_and_date: A date and time of recording of the PlayList.

PlayList_duration: Reproduction time of the PlayList.

maker_ID: A number identifying a manufacturer of the recorder that last updated the PlayList.

maker_model_code: A number identifying the recorder that last updated the PlayList.

ref_to_thumbnail_index: Specifies a thumbnail as a representative picture of the PlayList. A thumbnail having a thumbnail_index specified by the ref_thumbnail_index is a menu thumbnail representing the PlayList.

channel_number: A channel number of a recorded stream.

channel_name_length, channel_name: Stores a channel name. In the channel_name field, a character string of a length specified by the channel_name_length is valid. The same goes for a PlayList_name and a PlayList_detail.

PlayList_name_length, PlayList_name: Stores a PlayList name.

PlayList_detail_length, PlayList_detail: Stores detailed information of the PlayList.

A structure of the contents of the block PlayList( )structure is shown in FIG. 9. A length field indicates, in bytes, a length from a field immediately after the length to an end of the PlayList( ). A CPI_type field indicates a type of CPI (Characteristic Point Information) possessed by the PlayList. A number_of_PlayItems field indicates the number of PlayItems forming the PlayList. A number_of_SubPlayItems field indicates the number of PlayItems (SubPlayItems) for post-recording audio attached to the PlayList. A PlayItem( ) structure stores information of a PlayItem. A SubPlayItem( ) structure stores information of a SubPlayItem. The syntax provides that only when the PlayList is a Virtual PlayList and a certain condition is satisfied, the PlayList can have a SubPlayItem.

A structure of the contents of the block PlayItem( ) structure is shown in FIG. 10. A Clip_Information_file_name field stores, in a form of a character string, a file name of a Clip information file (file with the extension clpi) in one-to-one correspondence with a Clip referred to by the PlayItem. A connection_condition field includes information indicating a connection between the PlayItem and a next PlayItem, or indicating whether reproduction can be performed with no seam between the PlayItems. A ref_to_STC_id field specifies a STC_sequence (STC: System Time Clock) within a Clip. The STC_sequence information indicates a continuous range of PCR (Program Clock Reference) serving as a reference for a time base of an MPEG-2 TS, and is assigned a STC_id as a unique number within the Clip. Since a consistent, continuous time base can be defined within the STC_sequence, a start time and an end time of the PlayItem can be set uniquely. That is, the start point and the end point of each PlayItem must be present in the same STC_sequence.

An IN_time field indicates a pts (presentation_time_stamp) of the start point of the PlayItem on the STC_sequence. An OUT_time field indicates a pts of the end point of the PlayItem on the STC_sequence.

Figure 11:
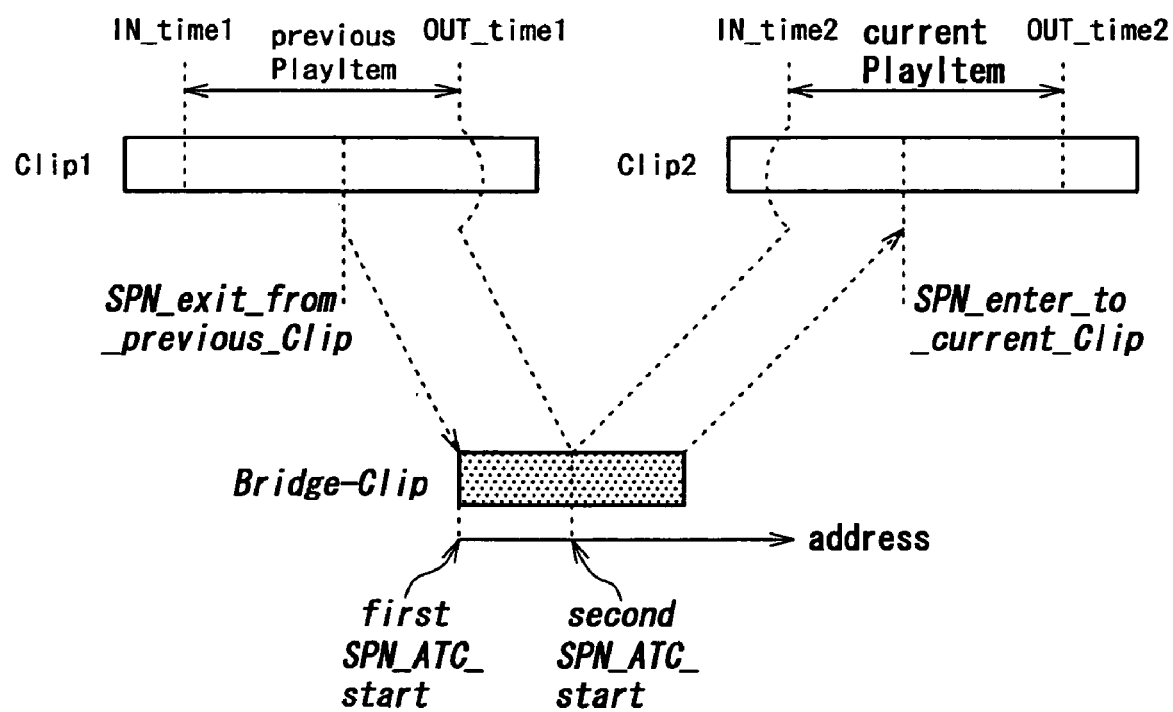
FIG. 11 is a diagram of a Bridge_sequence/Bridge_Clip data structure.

A BridgeSequenceInfo( ) structure stores information on a bit stream (Bridge_sequence, Bridge-Clip) created in realizing a function of seamlessly reproducing PlayItems by jumping to a bit stream different from the bit streams to be reproduced originally at a seam portion of the PlayItems and reproducing the bit stream instead, as shown in FIG. 11.

The PlayListMark( ) of FIG. 12 is a data structure for storing information of marks that enable setting of a search point in the PlayList and provision of a structure for dividing the PlayList into sections such as a chapter.

Figure 13:
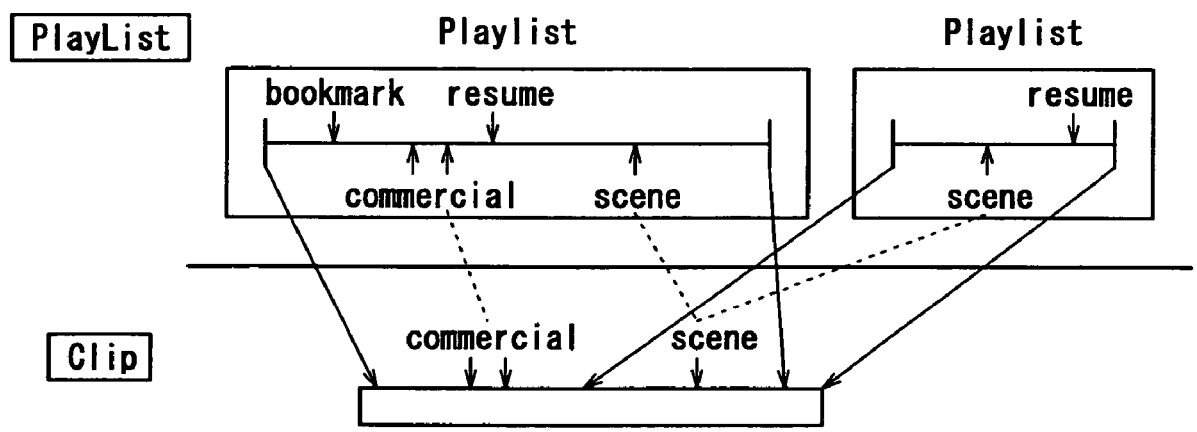
FIG. 13 is a diagram showing marks.

FIG. 13 is a diagram showing the operation of the marks. A mark indicates an arbitrary reproduction time on a PlayList or a Clip. The PlayList can be provided with a bookmark, which is a mark having a function as of a bookmark, and a resume mark indicating a point where next reproduction is desired to be started, and the like. The data structure storing the marks of the PlayList is represented by the PlayListMark( ) structure.

The Clip can be provided with a commercial mark indicating a commercial part of a television broadcast, and a scene mark indicating a characteristic scene. The marks of the Clip can also be used from a PlayList referring to the Clip. When there is a plurality of PlayLists referring to the same part on the Clip, common marks of the Clip appear in each of the PlayLists. A data structure storing the marks of the Clip is represented by a ClipMark( ) structure.

One %%%%%.clpi file is created under the /CLIPINF directory in correspondence with each AV stream file %%%%%.m2ts. FIG. 14 shows a structure of a %%%%%.clpi file. A block is formed for each piece of information with a different function within the file. A ClipInfo( ) structure stores information about the Clip. A SequenceInfo( ) structure stores information on a discontinuity point of PCR (Program Clock Reference) representing a time base of a transport stream in MPEG-2 systems. A ProgramInfo( ) structure stores information on a program in MPEG-2 systems. A CPI( ) structure stores information on CPI (Characteristic Point Information) indicating a characteristic point such as a random access start allowing point or the like in the AV stream. A ClipMark( ) structure stores information of marks of a search index point, a start point and an end point of a commercial and the like which marks are attached to the Clip. Address information indicating the head of these blocks are described in a head portion of the file.

An outline of data structure of a DVR format has been described above. Such data structure allows a PlayList to be constructed with a sequence of PlayItems that specify a part desired to be reproduced in an AV stream by a set of an IN point and an OUT point, and allows a combined reproduction unit perceived by a user to be managed. In addition, a directory DATA in FIG. 1 is provided for future extension of functions.

Information on reproduction control will next be described. The information on reproduction control in the present invention includes:

(1) the PIN information and the DVR_protect_flag flag in the file info.dvr (FIG. 3, FIG. 4, and FIG. 5) and (2) the playback_control_flag flag in the file #####.rpls or #####.vpls (FIG. 3, FIG. 7, and FIG. 8).

By defining meanings and operations of the player when the above flags are combined in an operation rule, it is possible to construct a new user interface as a video recorder, in accordance with the present invention. It is to be noted that reproduction control can include writing control depending on operation, and therefore the following description is directed to such writing control.

Reproduction control in a recorder using a removable recording medium comprises a reproduction control portion physically set on the recording medium and a reproduction control portion set by information recorded within the disk. The reproduction control physically set on the recording medium (disk) affects the entire disk. In a case of a recording medium with a cartridge, for example, a write disable switch attached to the cartridge can be operated to set the entire disk to a write disable state. In many cases, this setting can be changed without a code number.

When the information on reproduction control is recorded as data on the disk, on the other hand, the reproduction control can be effected in smaller units than a disk unit. Description in the following will be made of flags for recording such information on reproduction control as data on the disk.

Each PlayList has a 1-bit playback_control_flag flag (FIG. 8). An active playback_control_flag flag indicates that the PlayList cannot be reproduced. Further, when regarded as a flag for controlling visibility of the PlayList on a menu screen displaying a list of PlayLists, the playback_control_flag can be utilized as a flag for specifying whether the PlayList can be displayed on the menu screen. The visibility of the PlayList specifically means whether a thumbnail as a representative picture of the PlayList and the PlayList name are displayed on the menu screen. By not showing the PlayList name, the thumbnail, and detailed information on the menu screen and thereby preventing a user from selecting the PlayList, the user can create a state in which PlayList cannot be reproduced. There are methods for preventing the PlayList from being selected. One method is to prevent a user from selecting the PlayList which has an active playback_control_flag by a cursor. There is another method in which no PlayLists having an active playback_control_flag are displayed on the menu list but the user is informed of presence of hidden PlayLists by displaying information indicating the presence of the hidden PlayLists on the menu screen. There is yet another method that does not display real PlayList names and thumbnails, that is, displays all PlayLists on the menu list but brings the PlayList name of a PlayList having an active playback_control_flag into a hidden state such as "****" (hereinafter referred to as display in hidden characters).

In any case, the above management techniques required because reproduction control to such a degree that "a real PlayList name is visible but reproduction is not possible when it is actually selected" allows the content to be ascertained from the PlayList name, which is not sufficient for reproduction control.

Consideration should be given to the display of remaining capacity. It is important to display the remaining capacity or recordable time including PlayLists which are hidden from the user. When hidden PlayLists are present, then apparent remaining capacity, which is obtained by subtracting capacity occupied by PlayLists visible from the user from a total capacity of the disk, is larger than the actual remaining capacity. This may provide incorrect information to the user, and therefore the correct remaining capacity, including capacity occupied by not only the displayed PlayLists but also the hidden PlayLists, needs to be displayed on the menu screen.

The combination of the DVR_protect_flag flag of the info.dvr file and the playback_control_flag flag of the PlayList will next be considered. The flags are each a 1-bit flag, and hence there are four possible combinations. The conditions as shown in FIG. 15 result.

In the following, the four combinations will be described in order.

(A) Is a case where the flags of both a directory and all PlayLists are not active. In this case, nothing is prevented from being reproduced under the DVR directory, and therefore when the DVR directory is selected after insertion of the disk, all the PlayLists are displayed on a menu screen. That is, in this case, reproduction is not limited. This combination is suitable when the user is the only person using the disk.

(B) When only the DVR_protect_flag flag is active, reproduction of the directory is set to be disabled. In this condition, the following uses are possible.

The disk can be for the exclusive use of the user so that no other person can view the disk.
The disk can be used as a multi-user disk.

When there is only one directory on the disk, disabling the reproduction of the directory results in disabling the reproduction of the entire disk. When only one user uses the disk, viewing limitation is expected to be effected by this method.

On the other hand, this flag can be used to realize a multi-user disk. A plurality of directories is provided on the disk, and an owner of each of the directories is determined. When the disk having the plurality of directories is inserted into a player/recorder, the player/recorder first displays a screen for directory selection (folder selection). A user selects a directory owned by the user. At this time, when the DVR_protect_flag flag is active, the user is required to input a code number. When a correct code number is input, a list of PlayLists under the directory is displayed. Setting the code number prevents other persons from viewing the directory of the user and also eliminates the risk of other persons erasing the PlayLists under the directory of the user.

(C) Is a condition in which the DVR_protect_flag flag is inactive and the playback_control_flag flag are active. Considering the operation of the player/recorder in this case, when the directory is selected immediately after the disk is inserted into the player/recorder, the user is not required to input the code number because the DVR_protect_flag flag is inactive. The player/recorder needs to display only PlayLists with an inactive playback_control_flag on a menu screen by filtering. A PlayList with an active playback_control_flag does not appear on the menu screen or is displayed as a PlayList with a hidden PlayList name.

In a case of a user interface that displays presence of hidden PlayLists, when the PIN is input, all PlayLists are displayed on a list. There may be a user interface that displays a PlayList having an active playback_control_flag flag on the menu screen without its correct PlayList name and details. In this case, when the PlayList having the active playback_control_flag is selected to be reproduced, the user is prompted to input the PIN. When the correct PIN is input, all PlayLists are then displayed with real names thereof on the menu screen.

Thus, (C) can be used when unnecessary PlayLists are not desired to be displayed in personal use or when the disk is given to another person and only PlayLists desired by the creator to be shown are to be displayed on the menu screen, for example.

(D) Is a condition in which both the DVR_protect_flag flag and the playback_control_flag flag are active. When the management of (D) is a mere combination of the managements of (B) and (C), the code number needs to be input twice, or at the time of directory selection and at the time of PlayList selection. This is not convenient for a user. Hence, when reproduction is allowed by inputting the code number only once, at the time of directory selection only in the case of (D), an easy-to-use user interface may be realized. This is generalized to the following: "the PIN needs to be input once or more to reproduce or erase a PlayList with an active playback_control_flag."

The above uses of the PIN are summarized as follows.

Effective range of PIN

One PIN can be set in each DVR directory, and the PIN is a code number common to both the DVR_protect_flag flag and the playback_control_flag flag under the DVR directory.

Determining effectiveness of PIN

The PIN is effective when a value of a logical sum ("OR") of the DVR_protect_flag flag and all the playback_control_flags within the directory is "1." This needs to be checked not only at the time of reproduction but also at the time of erasing a directory or erasing the entire disk so as to prevent hidden PlayLists from being erased unnoticed.

Management of the number of inputs of PIN

The PIN needs to be input once or more to reproduce or erase a PlayList with an active playback_control_flag. That is, even when both the DVR_protect_flag flag and the playback_control_flag flag are active, the PIN does not need to be input twice, and may be input only once at the time of directory selection.

FIG. 16 is a block diagram of a moving image recording and reproducing apparatus in accordance with an embodiment of the present invention. The moving image recording and reproducing apparatus 50 includes a reproducing unit 51 and a recording unit 52. Basic operation of the moving image recording and reproducing apparatus 50 will hereinafter be described.

Recording of AV Stream

A description will first be provided of a case where an input audio-video signal is encoded and recorded. A video signal and an audio signal are input from a terminal 30 and a terminal 31, respectively. The video signal is input to an analyzing unit 24 and an AV encoder 23. The audio signal is also input to the AV encoder 23. The AV encoder 23 encodes the input video signal and audio signal, and then outputs an encoded video stream (V), an encoded audio stream (A), and system information (S) for AV synchronization and the like to a multiplexer 22.

The encoded video stream is an MPEG-2 video stream, for example. The encoded audio stream is for example an MPEG-1 audio stream, a Dolby AC3 audio stream or the like.

The multiplexer 22 multiplexes the input streams based on the input system information, and then outputs a multiplexed stream. The multiplexed stream is an MPEG-2 transport stream or an MPEG-2 program stream, for example. The multiplexed stream is input to an analyzing unit 25 and a source depacketizer 21. The source depacketizer 21 encodes the input multiplexed stream into an AV stream comprising source packets in accordance with an application format of a recording medium. The AV stream is processed by an ECC (error correction) encoding unit 20 and a modulating unit 19, and then input to a writing unit 18. The writing unit 18 records the AV stream file onto the recording medium (disk) 10 on the basis of a control signal from a control unit 17.

A description will next be provided of a case where a transport stream of a digital TV broadcast or the like input from a digital interface or a digital TV tuner is recorded. A transport stream is input from a terminal 32. There are two methods for recording the input transport stream: a method that transparently records the transport stream and a method that re-encodes and then records the transport stream for a purpose of lowering a recording bit rate or the like. Information specifying the recording method is input from a user interface to the control unit 17 via a terminal 28, whereby the control unit 17 controls the recording method.

When the input transport stream is to be recorded transparently, the transport stream is input to the analyzing unit 25 and the source depacketizer 21. Processing thereafter until an AV stream is recorded onto the recording medium 10 is the same as in the above case of encoding and recording the input audio signal and video signal.

When the input transport stream is re-encoded and recorded, the input transport stream is input to a demultiplexer 15. The demultiplexer 15 inputs a video stream (V) to an AV decoder 16. The AV decoder 16 decodes the video stream, and then inputs a reproduced video signal to the AV encoder 23. The AV encoder 23 encodes the input video, and then inputs an encoded video stream (V) to the multiplexer 22. On the other hand, an audio stream (A) and system information (S) output from the demultiplexer 15 are input directly to the multiplexer 22. The multiplexer 22 multiplexes the input streams based on the input system information, and then outputs a multiplexed stream. Processing thereafter until an AV stream is recorded onto the recording medium 10 is the same as in the above case of encoding and recording the input audio signal and video signal.

Recording of Application Database

The recording and reproducing apparatus 50 records an AV stream file and also records application database information describing the file. The application database information is created by the control unit 17. Information input to the control unit 17 include moving image characteristic information from the analyzing unit 25, AV stream characteristic information from the analyzing unit 25, and user instruction information input from the terminal 28.

The moving image characteristic information from the analyzing unit 25 relates to a characteristic image in an input moving image signal. For example, the moving image characteristic information includes information (mark) specifying a program start point, a scene change point, a start point or an end point of a commercial or the like, and also includes a thumbnail of an image at the specified position.

The AV stream characteristic information from the analyzing unit 25 relates to information on encoding of an AV stream to be recorded. For example, the AV stream characteristic information includes address information of an I-picture within the AV stream, encoding parameters of the AV stream, information on a point of change of the encoding parameters in the AV stream, information (mark) related to a characteristic image in the video stream, and the like.

The user instruction information input from the user interface via the terminal 28 includes information specifying a desired reproducing section in the AV stream, characters describing content in the reproducing section, information on a resume point or a bookmark set at a desired scene by the user, and the like.

Based on the above input information, the control unit 17 creates an AV stream database (Clip), a database of a PlayList formed by grouping reproducing sections (PlayItems) in the AV stream, information (info.dvr file directory) for managing content recorded on the recording medium, and thumbnail information. As with an AV stream, this database information is processed by the ECC (error correction) encoding unit 20 and the modulating unit 19, and then input to the writing unit 18. The writing unit 18 records a database file onto the recording medium 10 based on a control signal from the control unit 17.

Reproduction

Operation at the time of reproduction will next be described. The AV stream file and the application database information are recorded on the recording medium 10.

First, the control unit 17 instructs a reading unit 11 to read the application database information. The reading unit 11 reads the application database information from the recording medium 10. The database information is processed by a demodulating unit 12 and an ECC (error correction) decoding unit 12, and then input to the control unit 17.

Based on the application database, the control unit 17 outputs a list of PlayLists recorded on the recording medium (disk) 10 to the user interface via the terminal 28. The user selects a PlayList desired to be reproduced from the list of the PlayLists, and the PlayList specified for reproduction is input to the control unit 17. The control unit 17 instructs the reading unit 11 to read the AV stream file required for the reproduction of the PlayList. The reading unit 11 reads the AV stream from the recording medium 10. The AV stream is processed by the demodulating unit 12 and the ECC decoding unit 13, and then input to a source depacketizer 14.

The source depacketizer 14 converts the AV stream in the application format of the recording medium 10 into a stream that can be input to the demultiplexer 15. The demultiplexer 15 supplies to the AV decoder 16 a video stream (V), an audio stream (A), and system information (S) for AV synchronization and the like, which include a reproducing section (PlayItem) of the AV stream specified by the control unit 17. The AV decoder 16 decodes the video stream and the audio stream, and then outputs a reproduced video signal and a reproduced audio signal to a terminal 26 and a terminal 27, respectively.

When an instruction for random access reproduction or special reproduction is provided by the user interface, the control unit 17 determines a position to read an AV stream from the recording medium 10 based on the content of the AV stream database (Clip), and then instructs the reading unit 11 to read the AV stream. When a PlayItem selected by the user is reproduced from a time at a midpoint, for example, the control unit 17 instructs the reading unit 11 to read data of an I-picture having a time stamp closest to the specified time.

When an instruction for fast-forward playback is provided by the user, the control unit 17 instructs the reading unit 11 to read I-picture data in the AV stream sequentially on the basis of the AV stream database (Clip).

The reading unit 11 reads the data from a specified random access point. The read data is processed by the demodulating unit 12, the ECC decoding unit 13, and the source depacketizer 14, then input to the demultiplexer 15, and decoded by the AV decoder 16, whereby AV data is reproduced.

Editing

A description will next be provided of a case where the user edits an AV stream.

When the user desires to create a new reproduction path by specifying a reproducing section in an AV stream recorded on the recording medium 10, information of an IN point and an OUT point of the reproducing section is input from the user interface to the control unit 17 via the terminal 28. The control unit 17 creates a database of a group (PlayList) of reproducing sections (PlayItems) of AV streams.

When the user desires to erase a part of an AV stream recorded on the recording medium 10, information of an IN point and an OUT point of an erasing section is input from the user interface to the control unit 17 via the terminal 28. The control unit 17 changes the PlayList database to refer to only necessary AV stream portions.

Also, the control unit 17 instructs the writing unit 18 to erase the unnecessary stream portion of the AV stream.

Seamless Editing

A description will be provided of operation in a case where the user desires to create a new reproduction path by specifying a reproducing section in an AV stream recorded on the recording medium 10 and desires to connect reproducing sections seamlessly. In this case, the control unit 17 creates a database of a group (PlayList) of reproducing sections (PlayItems) of AV streams and may be required to perform partial re-encoding and re-multiplexing of a video stream around a point of connection between the reproducing sections.

First, information of an IN point picture and an OUT point picture of a reproducing section is input from the user interface to the control unit 17 via the terminal 28. The control unit 17 instructs the reading unit 11 to read data required to reproduce the IN point picture and the OUT point picture. The reading unit 11 reads the data from the recording medium 10. The data is passed through the demodulating unit 12, the ECC decoding unit 13, and the source depacketizer 14, and then inputted to the demultiplexer 15.

The control unit 17 analyzes a stream input to the demultiplexer 15, determines a re-encoding method (changing a picture_coding_type field and assigning an amount of encoding bits for re-encoding) and a re-multiplexing method for the video stream, and then supplies the methods to the AV encoder 23 and the multiplexer 22.

Next, the demultiplexer 15 separates the input stream into a video stream (V), an audio stream (A), and system information (S). (The video stream is "data input to the AV decoder 16" or "data input directly to the multiplexer 22." The former data is required to be re-encoded. The data is decoded by the AV decoder 16, and a decoded picture is re-encoded by the AV encoder 23 to form a video stream. On the other hand, the latter data is not re-encoded, and is copied from the original stream. The audio stream and the system information are input directly to the multiplexer 22.

The multiplexer 22 multiplexes the input streams based on the information input from the control unit 17, and then outputs a multiplexed stream. The multiplexed stream is processed by the ECC (error correction) encoding unit 20 and the modulating unit 19, and then input to the writing unit 18. The writing unit 18 records the AV stream onto the recording medium 10 based on a control signal from the control unit 17.

With respect to the DVR_protect_flag flag and the playback_control_flag flag, operation of the moving image recording and reproducing apparatus 50 after insertion of a disk (recording medium 10) will next be described with reference to flowcharts.

Figure 17:
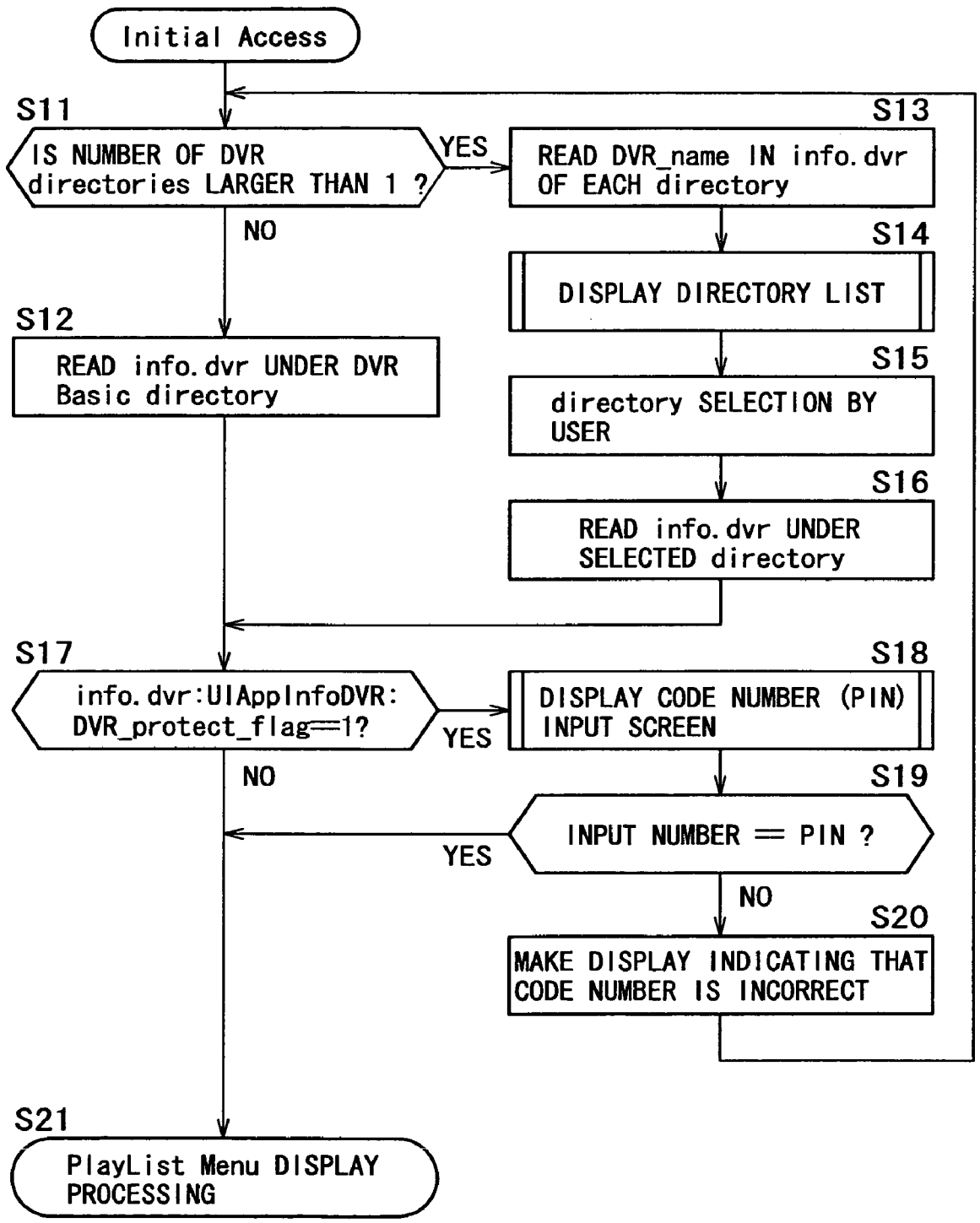
FIG. 17 is a flowchart of the operation of an apparatus of the present application in relation to a DVR_protect_flag at the time of initial reading.

FIG. 17 is a flowchart illustrating a process of how the DVR_protect_flag is used when a disk is inserted. When the number of DVR directories is more than one, a list of directories is displayed to allow the user to select a directory having a list of PlayLists desired to be viewed. When the DVR_protect_flag flag is "1" (active), the user is prompted to input a code number. Processing for displaying the list of PlayLists can be started only when a correct code number is input.

Specifically, at a step S11, the control unit 17 determines whether the number of directories recorded on the recording medium 10 is more than one. When the number of directories is equal to one, processing proceeds to step S12 where the control unit 17 reads an info.dvr file under the basic directory of the recording medium 10. That is, the info.dvr file shown second from the top in FIG. 3 is read at the step S12.

When the control unit 17 determines at step S11 that the number of directories is two or more, processing proceeds to step S13, where the control unit 17 reads a DVR_name field described in the info.dvr file of each of the directories (FIG. 4 and FIG. 5). At a next step S14, the control unit 17 performs processing for displaying a directory list. Specifically, the control unit 17 creates display data, and outputs the display data as a video output from the AV decoder 16 to a monitor (not shown) via the terminal 26 to display the display data. Thus, the read names of the directories are displayed in a list at this step.

Figure 18:
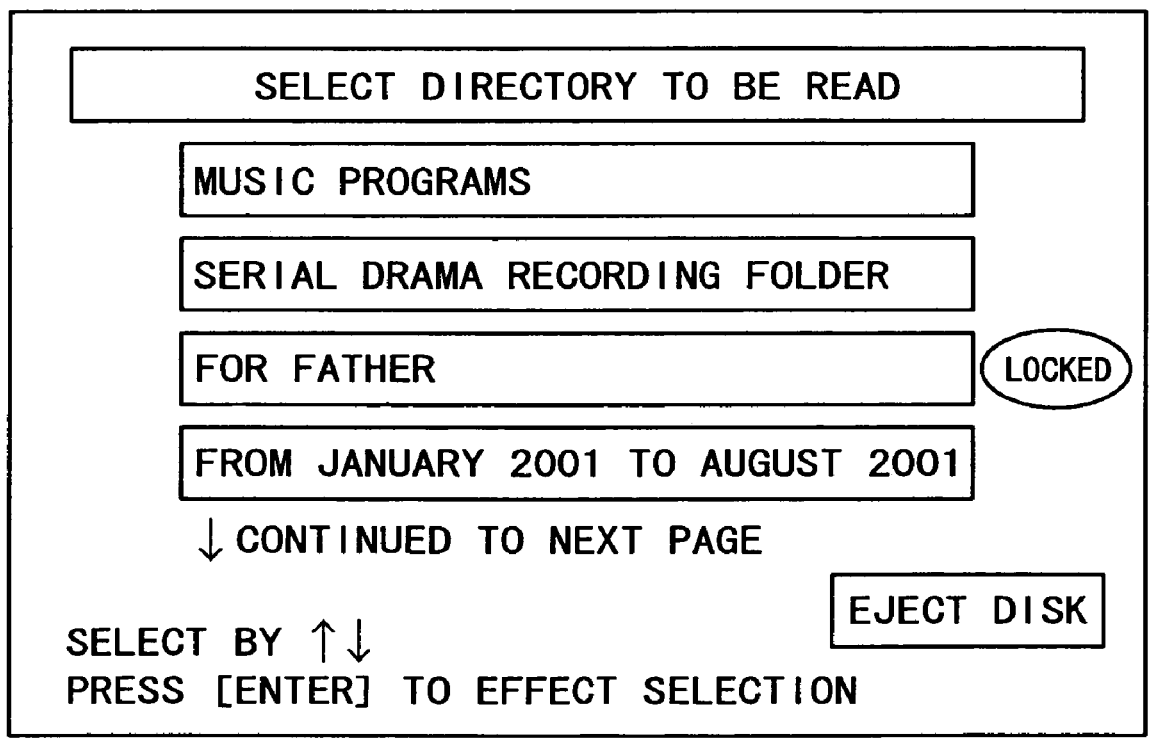
FIG. 18 is a diagram showing an example of a menu screen for directory selection.

FIG. 18 shows an example of a display in this case. In this example, directories "MUSIC PROGRAM," "SERIAL DRAMA RECORDING FOLDER," "FOR FATHER," and "FROM JANUARY 2001 TO AUGUST 2001" are displayed. Of the directories, the directory "FOR FATHER" has an active DVR_protect_flag flag, and therefore characters "LOCKED" is displayed. On the other hand, the directories "MUSIC PROGRAM," "SERIAL DRAMA RECORDING FOLDER," and "FROM JANUARY 2001 TO AUGUST 2001" each have an inactive DVR_protect_flag flag, and therefore the characters "LOCKED" is not displayed.

The user performs an operation to select a predetermined directory based on the display of the directory list. A result of the operation is input from the user interface to the control unit 17 via the terminal 28. When the control unit 17 receives a command corresponding to the selection of the directory by the user at step S15, the control unit 17 at step S16 reads an info.dvr file under the selected directory based on the command received at step S15. When the directory "FOR FATHER" is selected, for example, the info.dvr file of "FOR FATHER" is read.

After processing at step S12 or step S16, the control unit 17 proceeds to step S17 to determine whether the DVR_protect_flag flag is set to "1". As described above, the DVR_protect_flag flag is described in the UIAppinfoDVR( )structure (FIG. 5) of the info.dvr directory (FIG. 4).

When the DVR_protect_flag is equal to "1" (when this flag is active), processing proceeds to step S18, where the control unit 17 performs processing for displaying a code number (PIN) input screen. Specifically, the control unit 17 displays a code number (PIN) input screen as shown in FIG. 19, for example. In this display example, a message reading "THIS DIRECTORY IS LOCKED. INPUT CODE NUMBER TO RELEASE LOCK." is displayed. The user inputs the code number assigned to the selected directory. As described above, this code number is formed by a four-digit number. In the example of FIG. 19, "1234" is input as the code number. When the user inputs the code number, the code number is input from the user interface to the control unit 17 via the terminal 28.

At step S19, the control unit 17 determines whether the input number is equal to the PIN (FIG. 5) registered in correspondence with the directory. When the input number is not equal to the PIN, processing proceeds to step S20 where the control unit 17 provides a display indicating that the code number is not correct. Thereafter, processing returns to step S11, and processing from step S11 downward is repeated.

When the control unit 17 determines at step S17 that the DVR_protect_flag flag is not equal to "1" (when this flag is inactive), and when the control unit 17 determines at step S19 that the input number is equal to the PIN, processing proceeds to step S21, where the control unit 17 performs processing for displaying a PlayList menu. Examples of the PlayList menu displaying processing are shown in FIG. 20 and FIG. 21 to be described later.

Figure 20:
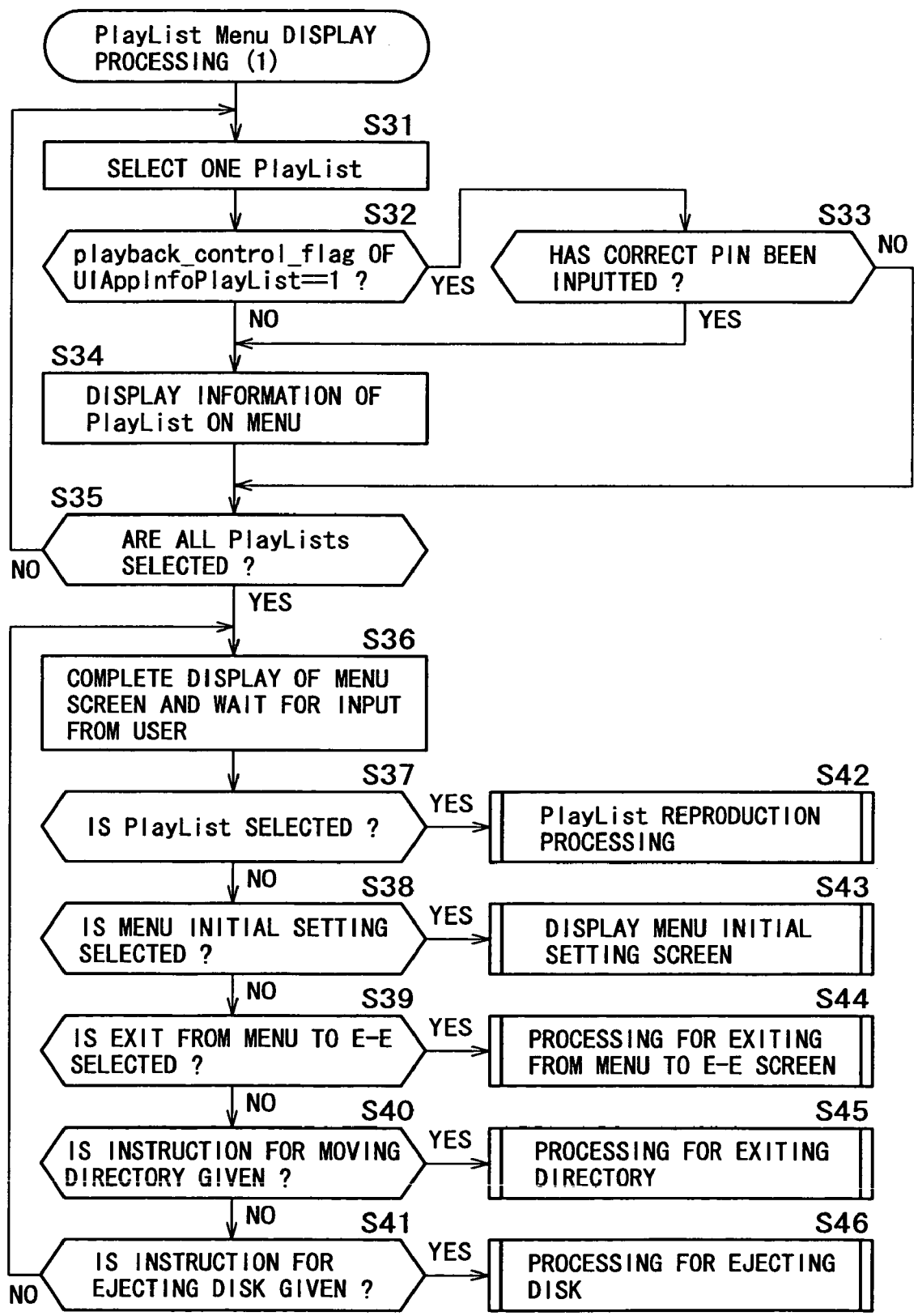
FIG. 20 is a flowchart of processing of displaying a PlayList menu.
Figure 21:
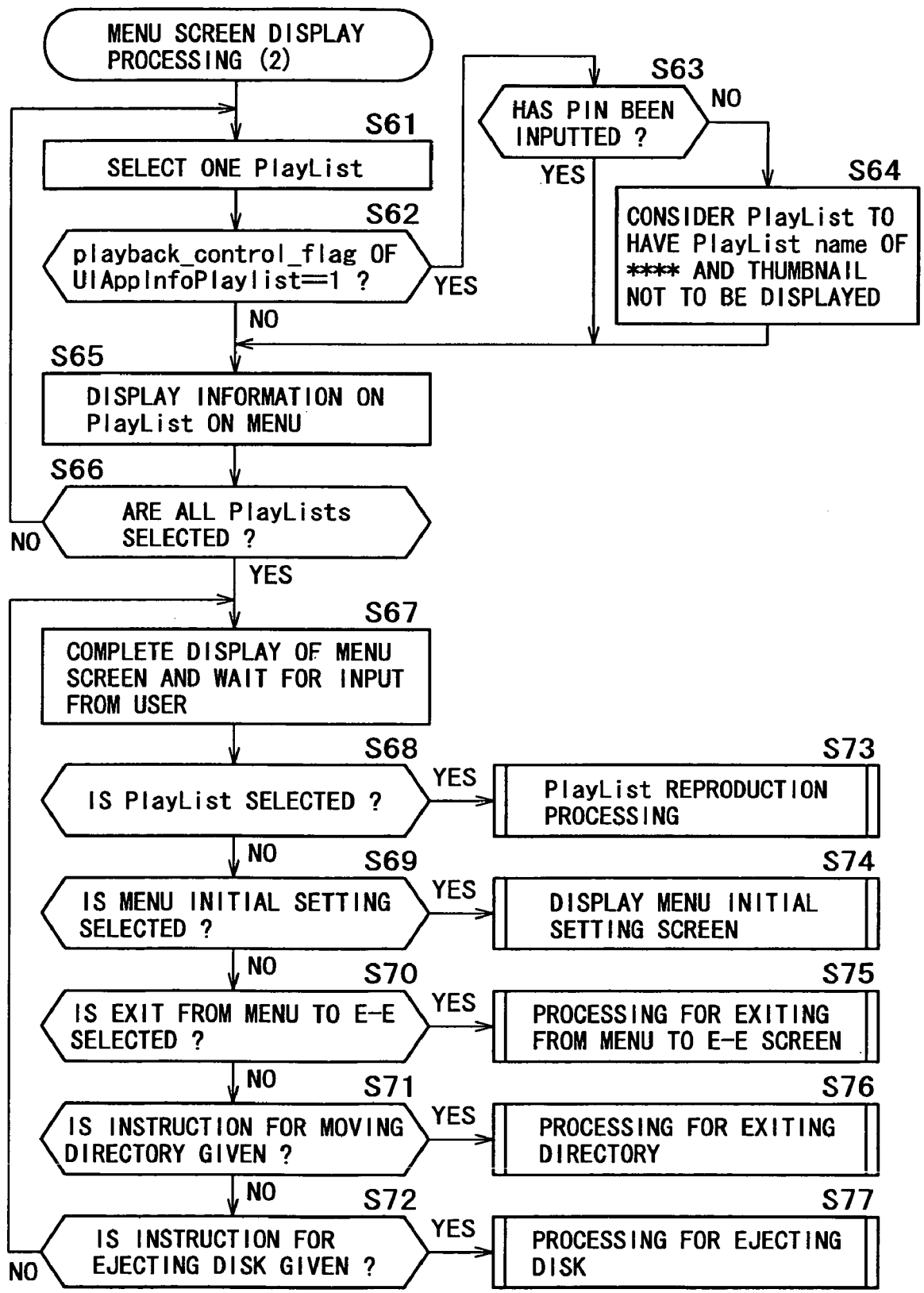
FIG. 21 is a flowchart of showing other processing for displaying a PlayList menu.

FIG. 20 is a flowchart of a first example of processing for displaying a PlayList menu. When a PlayList has an active playback_control_flag flag and the code number has not been input once, the PlayList is not displayed on the menu. When the code number is already input at the time of selecting the directory or on the PlayList menu, the PlayList can be displayed.

Specifically, at step S31, the control unit 17 selects one PlayList (FIG. 7). At step S32, the control unit 17 reads an UIAppInfoPlayList( ) structure (FIG. 8) included in the PlayList (xxxxx.rpls or yyyyy.vpls) (FIG. 7) selected at step S31, and determines whether a playback_control_flag flag included in the UIAppInfoPlayList( ) structure is set to "1". When the flag is set to "1" (i.e., when the flag is active), processing proceeds to step S33, where the control unit 17 determines whether a correct PIN has been input. As described above, this process is performed following the process of FIG. 17. Hence, when the PlayList menu displaying processing of FIG. 20 is being performed after the process at steps S17, S18, and S19, the PIN has already been input. Thus, in this case, and in a case where it is determined at step S32 that the playback_control_flag flag is not equal to "1" (i.e., that the flag is inactive), processing proceeds to step S34, where the control unit 17 performs processing for displaying information on the PlayList on the menu. Thereby, a name and the like of the PlayList are displayed.

When it is determined at step S33 that the correct PIN has not been input, processing at step S34 is skipped.

The control unit 17 thereafter determines at step S35 whether all PlayLists are selected. When there is a PlayList not selected yet, processing returns to step S31, and processing from step S31 downward is repeated.

When it is determined at step S35 that all PlayLists are selected, processing proceeds to step S36, where the control unit 17 completes display of the menu screen. Then the control unit 17 waits for input from the user.

Specifically, the control unit 17 determines at steps S37 to S41 whether a PlayList is selected, whether menu initial setting is selected, whether an exit from the menu to E-E (Electric to Electric: a state that allows a signal from a tuner or an input terminal to be output as is) is selected, whether a command for moving a directory is provided, or whether a command for ejecting the disk is provided. When any of these determinations is equal to "NO", processing returns to step S36, and processing from the step S36 downward is repeated.

When it is determined at step S37 that a PlayList is selected, the control unit 17 proceeds to step S42 to perform PlayList reproduction processing. When it is determined at step S38 that menu initial setting is selected, the control unit 17 proceeds to step S43 to perform processing for displaying a menu initial setting screen.

When it is determined at step S39 that an exit from the menu to E-E is selected, the processing proceeds to step S44, where the control unit 17 performs processing for exiting the menu and performs processing for changing display to an E-E screen.

When it is determined at step S40 that an instruction for moving a directory is provided, processing proceeds to step S45 where the control unit 17 performs processing for exiting the directory.

When it is determined at step S41 that a command for ejecting the disk (recording medium 10) is provided, processing proceeds to step S46 where the control unit 17 performs processing for ejecting the disk.

FIG. 21 is a flowchart of a second example of processing for displaying a PlayList menu. The second example of processing is different from the processing of the flowchart of FIG. 20 in that when there is a PlayList having an active playback_control_flag flag and the code number has not been input once, the second example of processing places the PlayList on the PlayList menu with a real name of the PlayList hidden and without a thumbnail picture. The user recognizes the presence of the PlayList with the hidden name on the PlayList menu, and may select the PlayList. In such a case, the user is prompted to input the code number, and when the correct code number is input, the real name is displayed.

Specifically, at step S61, the control unit 17 selects one PlayList. At step S62, the control unit 17 determines whether a playback_control_flag flag corresponding to the PlayList is equal to "1". When the flag is equal to "1" (i.e., when the flag is active), processing proceeds to step S63, where the control unit 17 determines whether a correct PIN has been input. The process at steps S61 to S63 is the same as the above-described processing at the steps S31 to S33 in FIG. 20.

When the control unit 17 determines at step S63 that the PIN has not been input, the control unit 17 proceeds to step S64 to display the PlayList name using character ****. That is, the PlayList name is displayed in hidden characters. Also, the control unit 17 effects control so as not to display a thumbnail picture of the PlayList.

When it is determined at step S63 that the PIN has been input, processing at step S64 is skipped.

When it is determined at step S62 that the playback_control_flag flag is not equal to "1" (i.e., when it is determined that the flag is equal to "0"), when it is determined at step S63 that the PIN has been input, and when processing at step S64 is complete, processing proceeds to step S65, where the control unit 17 performs processing for displaying information on the PlayList on the menu. The control unit 17 thereafter determines at step S66 whether all PlayLists are selected. When a PlayList has not yet been selected, processing returns to step S61, and processing from step S61 downward is repeated.

When it is determined at step S66 that all PlayLists are selected, processing proceeds to step S67, where the control unit 17 completes the processing of displaying the menu screen. Then the control unit 17 waits for new input from the user.

The menu screen in this case is displayed as shown in FIG. 22, for example. In this display example, PlayLists "DRAMA," "PROFESSIONAL BASEBALL RELAY BROADCAST 50TH GAME," AND "FOREIGN-FILM THEATER" are displayed as PlayLists for reproduction, and a PlayList is displayed as hidden characters "* . . . ." Since the PlayList displayed in hidden characters has a playback_control_flag flag set at "1", reproducing the PlayList requires input of the PIN.

Subsequent processing of steps S68 to S77 is the same as the processing of steps S37 to S46 in FIG. 20, and therefore its description will be omitted.

Figure 23:
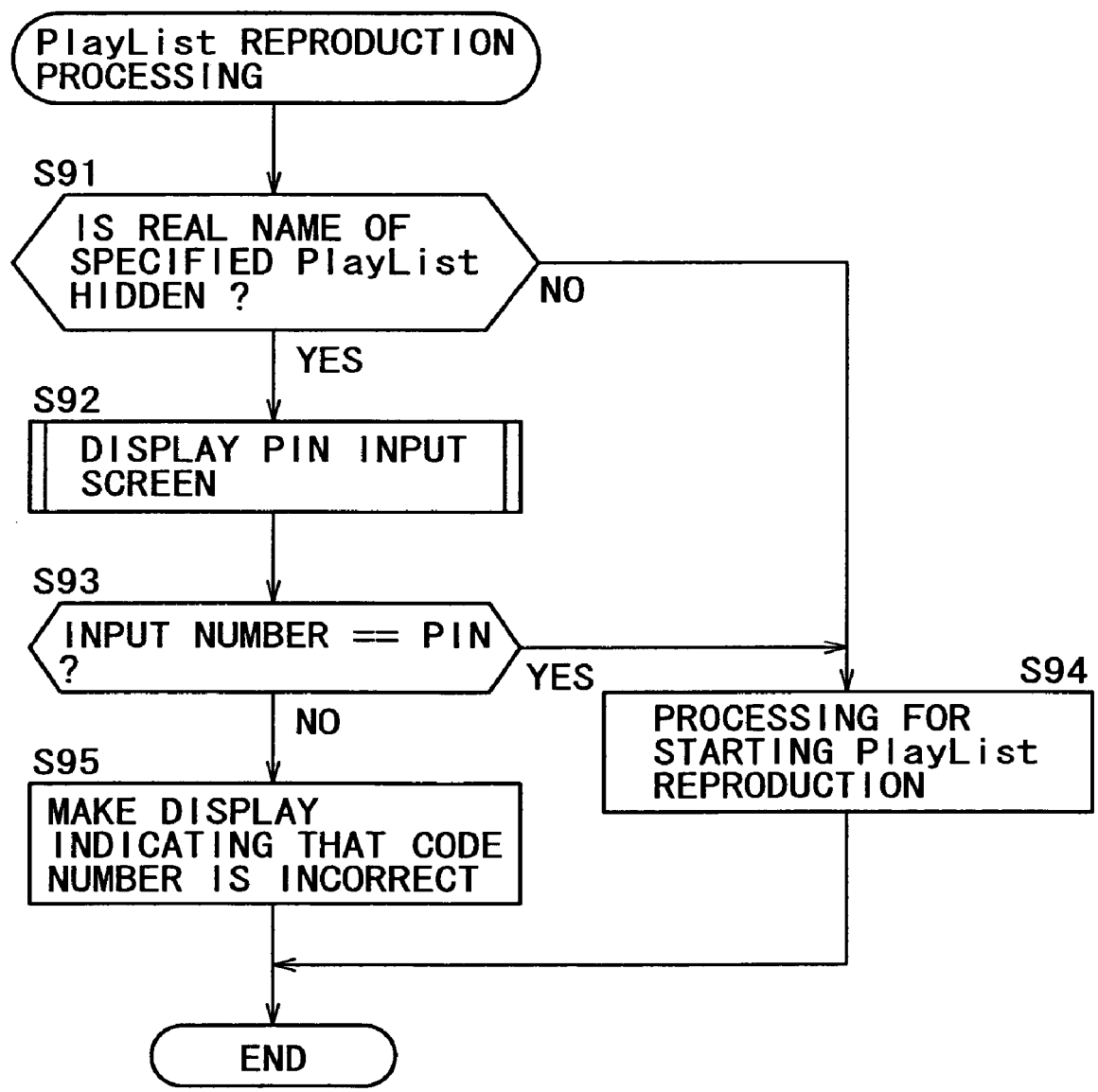
FIG. 23 is a flowchart of PlayList reproduction processing.

When it is determined at step S68 that a PlayList is selected, processing proceeds to step S73 to perform PlayList reproduction processing. Details of processing in this case are shown in a flowchart of FIG. 23.

Specifically, the control unit 17 determines at step S91 whether the real name of the specified PlayList is hidden, that is, whether the PlayList is displayed in hidden characters. When the PlayList displayed in hidden characters is specified (i.e., when the third PlayList from the top in FIG. 22 is selected, for example), processing proceeds to step S92, where the control unit 17 displays a PIN input screen (this screen is similar to that of FIG. 19 which is a screen for input of the code number for releasing a lock to the PlayList rather than the directory).

Based on this display, the user inputs the code number, which releases the lock to the directory.

At step S93, the control unit 17 determines whether the input number is equal to the PIN registered in correspondence with the specified PlayList. When the input number is not equal to the PIN, processing proceeds to step S95, where the control unit 17 provides a display indicating that the code number is not correct, and then the control unit 17 ends processing. That is, in this case, since the code number is not correct, the user cannot reproduce the PlayList.

On the other hand, when it is determined at step S91 that the real name of the specified PlayList is not hidden (when the PlayList with the name "DRAMA" at the top in FIG. 22 is selected, for example), and when it is determined at step S93 that the input number is equal to the PIN, processing proceeds to step S94, where the control unit 17 starts processing for reproducing the specified PlayList.

Figure 24:
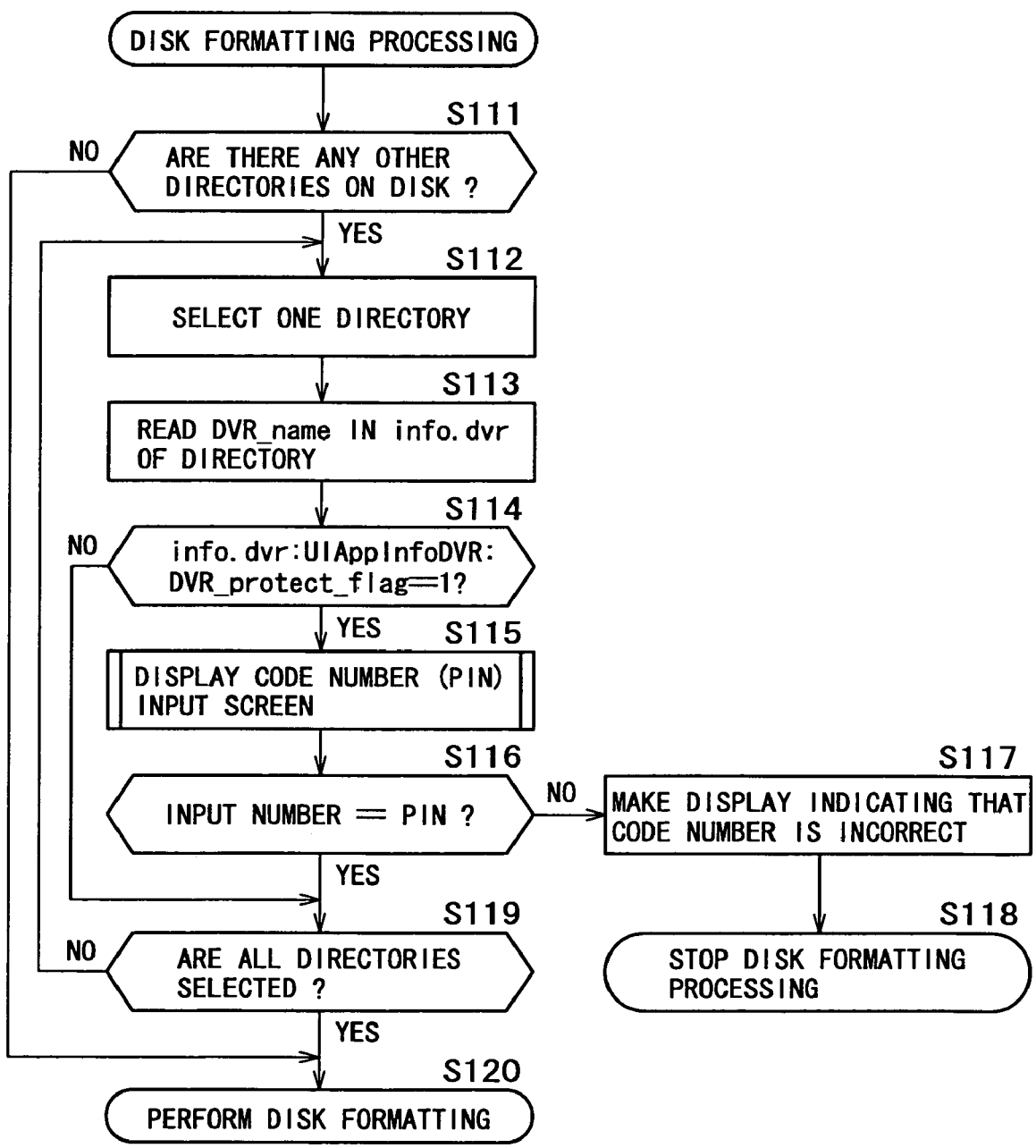
FIG. 24 is a flowchart of disk formatting processing.

FIG. 24 is a flowchart illustrating use of flags related to reproduction control in formatting the disk (totally erasing the disk). In order to prevent inadvertent deletion, when there is another directory on the disk and the code number (PIN) of the directory is effective, it is necessary to allow only a user knowing the code number to perform formatting. A recorder which does not check other directories and prompt for input of the code number, performs a "stops formatting" function when there is even one other directory on the disk to be formatted. This can prevent the situation in which data in another directory, in which data is not intended to be erased, is accidentally erased.

At step S111, the control unit 17 determines whether there are other directories on the disk (recording medium 10). When there are other directories, processing proceeds to step S112 where the control unit 17 selects one directory. At step S113, the control unit 17 reads a DVR_name (FIG. 5) described in the info.dvr file (FIG. 4) of the directory. At step S114, the control unit 17 determines whether a DVR_protect_flag flag (FIG. 5) of the directory is equal to "1" (active). When this flag is active, processing proceeds to step S115, where the control unit 17 displays a code number (PIN) input screen. Thus, the code number input screen as shown in FIG. 19 is displayed. Based on the input screen, a user can input a code number.

At step S116, the control unit 17 determines whether the number input by the user is equal to the PIN (FIG. 5) registered in correspondence with the directory. When the input number is not equal to the registered PIN, processing proceeds to step S117 where the control unit 17 provides a display indicating that the code number is not correct. The control unit 17 proceeds to step S118 to stop formatting the disk.

On the other hand, when it is determined at step S116 that the input number is equal to the PIN, processing proceeds to step S119. Also when it is determined at step S114 that the DVR_protect_flag flag is not equal to "1" (i.e., when it is determined that the DVR_protect_flag flag is equal to "0"), processing proceeds to step S119.

The control unit 17 determines at step S119 whether all the directories are selected. When a directory is not yet selected, processing returns to step S112, and processing from step S112 downward is repeated.

When it is determined at step S119 that all the directories are selected, processing proceeds to step S120, where the control unit 17 formats the disk.

When it is determined at step S111 that there are no other directories on the disk, processing at steps S112 to S119 is skipped, and processing proceeds directly to step S120 to format the disk.

Figure 25:
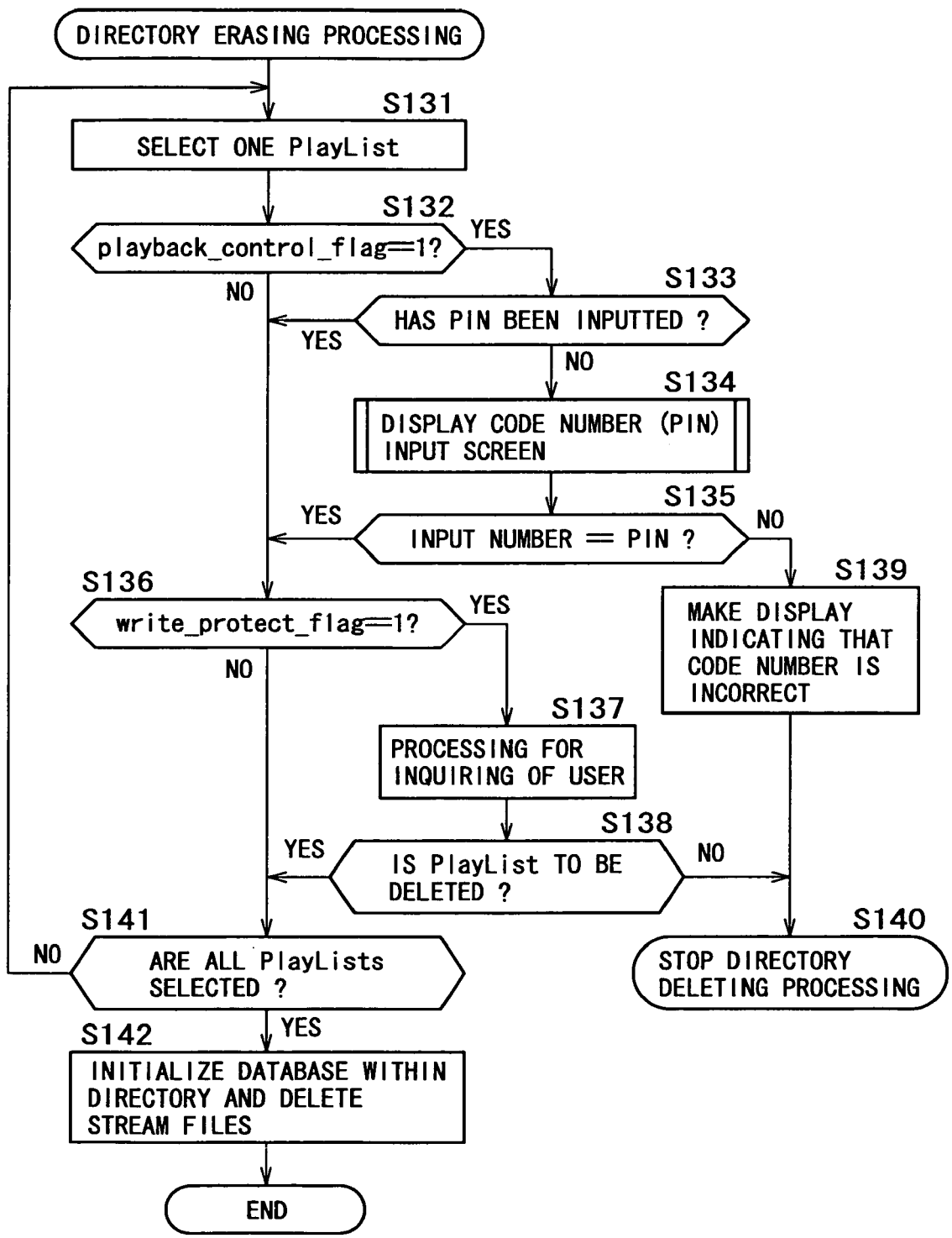
FIG. 25 is a flowchart of directory erasing processing.

FIG. 25 is a flowchart of a process for erasing an entire directory (i.e., erasing all PlayLists under a directory). A recorder that does not check for other directories at the time of formatting the disk can be replace the disk formatting function with a directory erasure function. In a case where a directory is to be erased and the PIN of the directory is effective, the PIN is required to be input to prevent the directory from being erased when there is a hidden PlayList. Also, when a write_protect_flag (i.e., a flag for prohibiting rewriting of a PlayList) of a PlayList is active, an inquiry is made of the user whether the PlayList may be erased. Since the write_protect_flag flag can be changed without inputting the PIN, it is sufficient to alert the user.

Specifically, at step S131, the control unit 17 selects one PlayList. The control unit 17 determines at step S132 whether the playback_control_flag flag (FIG. 8) of the selected PlayList is equal to "1". When the flag is equal to "1" (i.e., when the flag is active), the control unit 17 proceeds to step S133 to determine whether the PIN has already been input. When the PIN has not been input, processing proceeds to step S134, where the control unit 17 displays a screen for input of the code number. Based on this display, the user inputs the code number corresponding to the directory. The control unit 17 determines at step S135 whether or not the number input by the user is equal to the PIN pre-registered in correspondence with the directory. When the input number is not equal to the pre-registered PIN, processing proceeds to step S139 where the control unit 17 provides a display indicating that the code number is not correct. At step S140, the directory erasing processing is stopped.

When it is determined at step S132 that the playback_control_flag flag is not equal to "1" (i.e., when it is determined that the playback_control_flag is "0"), when it is determined at step S133 that the PIN has already been input, and when it is determined at step S135 that the input number is equal to the PIN, processing proceeds to step S136, where the control unit 17 determines whether the write_protect_flag flag (FIG. 8) is equal to "1" (i.e., whether the write_protect_flag flag is active). When the flag is active, processing proceeds to step S137, where the control unit 17 performs makes inquiries of the user. Specifically, the control unit 17 displays, for example, a message to the user reading "Is this PlayList to be deleted?" and prompts for an input of "YES" or "NO".

The control unit 17 determines at step S138 whether the PlayList is allowed to be deleted based on a user input corresponding to the inquiring process at step S137. When an input of "NO" is received from the user, the control unit 17 proceeds to step S140 to perform a function to stop the directory deleting processing.

On the other hand, when an input of "YES" is received from the user, and when it is determined at step S136 that the write_protect_flag is not equal to "1" (i.e., when it is determined that the write_protect_flag flag is equal to "0"), processing proceeds to step S141, where the control unit 17 determines whether all PlayLists are selected. When a PlayList is not yet selected, processing returns to step S131, and processing from step S131 downward is repeated. When it is determined that all PlayLists are selected, processing proceeds to step S142, where the control unit 17 performs processing for initializing databases within the specified directory and processing for deleting stream files.

By incorporating the DVR_protect_flag flag and the playback_control_flag flag as described above into standards and determining their use, a user is provided with finer reproduction control in a form that is easy for the user to understand and use.

With the recording medium reproducing apparatus and method according to the present invention, when first control information for controlling reproduction of information in each directory which information is recorded on a recording medium and second control information for controlling reproduction of each reproduction list belonging to the directory are both active, based on the input of a code number for either of the first control information or the second control information, input of the code number for the other control information is determined. Therefore a user is not required to input the code number twice, and thus operability can be improved.

The recording medium according to the present invention records first control information for controlling reproduction of recorded information in each directory, second control information for controlling reproduction of each reproduction list belonging to the directory, and a code number corresponding to each of a plurality of directories. Therefore, a plurality of users can share one recording medium while maintaining mutual confidentiality.

The invention claimed is:

1. A reproducing apparatus, comprising:
   setting means for setting first control information in a file for controlling reproduction of information under a directory on a recording medium, the directory having a reproduction list, and for setting second control information in the reproduction list for controlling reproduction of the reproduction list;

input means for inputting a code number; and reproduction permitting means for permitting the reproduction of information, even when the first control information and the second control information are both active, if the inputted code number is consistent with a personal identification number (PIN) which is recorded in the file, whether or not input of the said code number for the other control information is required.

2. A reproducing apparatus as claimed in claim 1, wherein the recording medium includes a plurality of directories and the code number is set in each of the directories.

3. A reproducing apparatus as claimed in claim 1, wherein the reproduction list includes a playlist.

4. A reproducing apparatus as claimed in claim 1, further comprising display control means for controlling display of information in the directory or the reproduction list,
wherein the display control means prohibits display of the information in the directory or the reproduction list when the first control information or the second control information is active.

5. A reproducing apparatus as claimed in claim 1, further comprising display control means for controlling display of information in the directory or the reproduction list,
wherein the display control means displays the information in the directory or the reproduction list to prevent selection thereof when the first control information or the second control information is active.

6. A reproducing apparatus as claimed in claim 1, further comprising display control means for controlling display of information regarding the directory or the reproduction list,
wherein the display control means displays the information regarding the directory or the reproduction list as hidden characters when the first control information or the second control information is active.

7. A reproducing apparatus as claimed in claim 1, further comprising display control means for controlling display of information regarding a recordable capacity of the recording medium,
wherein, when selected information, in which associated first control information or second control information is active is recorded on the recording medium, the display control means controls display of the information regarding the recordable capacity such that the recordable capacity does not include a capacity occupied by the selected information.

8. A reproducing method comprising:
setting first control information in a file for controlling reproduction of information under a directory on a recording medium, the directory having a reproduction list, and for setting second control information in the reproduction list for controlling reproduction of the reproduction list;
inputting a code number; and
permitting the reproduction of information, even when the first control information and the second control information are both active, if the inputted code number is consistent with a personal identification number (PIN) which is recorded in the file, whether or not input of the said code number for the other control information is required.

9. A recording medium recorded with a computer readable program for causing a computer to execute a reproducing method, the method comprising:
setting first control information in a file for controlling reproduction of information under a directory on a recording medium, the directory having a reproduction list, and for setting second control information in the reproduction list for controlling reproduction of the reproduction list;
inputting a code number; and
permitting the reproduction of information, even when the first control information and the second control information are both active, if the inputted code number is consistent with a personal identification number (PIN) which is recorded in the file, whether or not input of the said code number for the other control information is required.

10. A system for processing information, the system comprising:
a processor operable to execute instructions; and
instructions for causing the processor to execute an reproducing method, the method including:
setting first control information in a file for controlling reproduction of information under a directory on a recording medium, the directory having a reproduction list, and for setting second control information in the reproduction list for controlling reproduction of the reproduction list;
inputting a code number; and
permitting the reproduction of information, even when the first control information and the second control information are both active, if the inputted code number is consistent with a personal identification number (PIN) which is recorded in the file, whether or not input of the said code number for the other control information is required.

11. A reproducing apparatus, comprising:
setting mechanism operable to set first control information in a file for controlling reproduction of information under a directory on a recording medium, the directory having a reproduction list, and to set second control information in the reproduction list for controlling reproduction of the reproduction list;
input mechanism operable to input a code number; and
permitting mechanism operable to permit the reproduction of information, even when the first control information and the second control information are both active, if the inputted code number is consistent with a personal identification number (PIN) which is recorded in the file, whether or not input of the said code number for the other control information is required.

* * * * *